United States Patent
Flynn et al.

(10) Patent No.: US 11,291,182 B2
(45) Date of Patent: Apr. 5, 2022

(54) DEVICE FOR FACILITATING AND TRACKING THE FEEDING OF AN ANIMAL

(71) Applicant: Nexfeed LLP, Lake Orion, MI (US)

(72) Inventors: Gregory S. Flynn, Lake Orion, MI (US); Jennifer Coppola, Sterling Heights, MI (US)

(73) Assignee: Nexfeed LLP, Lake Orion, MI (US)

( * ) Notice: Subject to any disclaimer, the term of this patent is extended or adjusted under 35 U.S.C. 154(b) by 281 days.

(21) Appl. No.: 16/266,899

(22) Filed: Feb. 4, 2019

(65) Prior Publication Data

US 2019/0239472 A1 Aug. 8, 2019

Related U.S. Application Data

(60) Provisional application No. 62/626,371, filed on Feb. 5, 2018.

(51) Int. Cl.
| | | |
|---|---|---|
| *A01K 5/02* | (2006.01) | |
| *A01K 5/01* | (2006.01) | |
| *G01F 19/00* | (2006.01) | |

(52) U.S. Cl.
CPC .............. *A01K 5/0114* (2013.01); *A01K 5/02* (2013.01); *G01F 19/002* (2013.01)

(58) Field of Classification Search
CPC ... A01K 5/0114; A01K 5/0291; G01F 19/002; G06M 1/045; G06M 1/028; A47F 13/08
USPC ............................................... 222/30, 36–38
See application file for complete search history.

(56) References Cited

U.S. PATENT DOCUMENTS

| | | | | |
|---|---|---|---|---|
| 1,619,878 A | * | 3/1927 | Morgan | A61J 7/04 |
| | | | | 30/123 |
| 1,700,355 A | * | 1/1929 | Fuller | G06C 27/00 |
| | | | | 222/30 |
| 2,916,837 A | * | 12/1959 | Bosland | G09D 3/06 |
| | | | | 40/114 |
| 3,214,763 A | * | 10/1965 | Davis | B67D 7/08 |
| | | | | 346/43 |
| 4,188,984 A | | 2/1980 | Lyall | |
| 5,482,163 A | * | 1/1996 | Hoffman | A61J 7/04 |
| | | | | 116/309 |
| 5,718,355 A | | 2/1998 | Garby et al. | |
| 5,884,523 A | | 3/1999 | Cheng et al. | |
| 6,000,159 A | * | 12/1999 | Hornung | G09F 11/23 |
| | | | | 116/308 |

(Continued)

FOREIGN PATENT DOCUMENTS

| | | |
|---|---|---|
| CN | 103843681 A | 6/2014 |
| EP | 2937674 A1 | 10/2015 |

(Continued)

*Primary Examiner* — Peter M Poon
*Assistant Examiner* — Shada Mohamed Alghailani
(74) *Attorney, Agent, or Firm* — Raggio & Dinnin, P.C.

(57) ABSTRACT

An assembly for facilitating feeding an animal and tracking a feeding schedule of the animal includes a scoop, a base member, and a temporal display. The scoop includes a handle and a receptacle. The base member is configured to receive the scoop. The temporal display is attached to one of the scoop or the base member and displays a first temporal message when the scoop is in a first orientation relative to the base member and a second temporal message when the scoop is manipulated from the first orientation to a second orientation relative to the base member.

8 Claims, 35 Drawing Sheets

(56) References Cited

U.S. PATENT DOCUMENTS

| | | | |
|---|---|---|---|
| D429,853 S * | 8/2000 | Hammond | D30/162 |
| 6,135,056 A | 10/2000 | Kuo | |
| 6,404,838 B1 | 6/2002 | Hall | |
| 6,470,745 B1 | 10/2002 | Reay et al. | |
| 6,578,807 B1 | 6/2003 | Lipscomb et al. | |
| 6,729,330 B2 * | 5/2004 | Scarrott | A61M 15/009 128/200.23 |
| 7,100,530 B2 * | 9/2006 | Lu | A61M 15/009 116/307 |
| 7,621,273 B2 * | 11/2009 | Morton | A61M 15/0065 128/205.23 |
| 7,743,945 B2 * | 6/2010 | Lu | A61M 15/0065 222/36 |
| 8,082,873 B2 * | 12/2011 | Nuttall | A61M 15/009 116/285 |
| 8,245,704 B2 * | 8/2012 | Rand | A61M 15/008 128/200.23 |
| 8,453,592 B2 | 6/2013 | Edwards et al. | |
| 8,479,732 B2 * | 7/2013 | Stuart | A61M 15/009 128/205.23 |
| 8,511,519 B2 | 8/2013 | Mahle et al. | |
| 8,662,381 B2 * | 3/2014 | Kaar | A61M 15/0078 235/87 R |
| 8,869,735 B2 | 10/2014 | Lu | |
| 9,625,302 B2 | 4/2017 | Inglis | |
| D792,661 S | 7/2017 | Wold | |
| 2005/0263082 A1 * | 12/2005 | Rutledge | A01K 5/0275 119/51.01 |
| 2006/0096594 A1 * | 5/2006 | Bonney | G06M 1/028 128/202.17 |
| 2006/0180566 A1 * | 8/2006 | Mataya | A61J 7/04 215/230 |
| 2009/0261113 A1 * | 10/2009 | Miota | G01F 19/002 220/660 |
| 2011/0056426 A1 * | 3/2011 | Fralick | A61J 7/04 116/308 |
| 2012/0079881 A1 | 4/2012 | Olson | |
| 2012/0240842 A1 * | 9/2012 | Edwards | G01F 19/002 116/327 |
| 2012/0240862 A1 * | 9/2012 | Edwards | A01K 5/0114 119/51.01 |
| 2013/0203024 A1 * | 8/2013 | Dekar | A47G 21/08 434/127 |
| 2016/0000036 A1 * | 1/2016 | Cornwell, Jr. | A01K 5/0114 119/51.11 |
| 2016/0203698 A1 * | 7/2016 | Steinbok | G08B 21/18 340/521 |
| 2017/0184435 A1 | 6/2017 | Inglis | |
| 2017/0258250 A1 * | 9/2017 | Gaine | G01F 19/002 |
| 2018/0222645 A1 * | 8/2018 | Nicholes | B65D 43/169 |
| 2019/0128722 A1 * | 5/2019 | Caldwell | A01K 5/00 |
| 2020/0115092 A1 * | 4/2020 | Nehus | B65B 69/0008 |
| 2020/0191634 A1 * | 6/2020 | Rivera | G01F 19/002 |
| 2020/0386599 A1 * | 12/2020 | Lee | G01F 19/002 |

FOREIGN PATENT DOCUMENTS

| | | |
|---|---|---|
| GB | 2331979 A | 6/1999 |
| WO | 2004008083 A1 | 1/2004 |

* cited by examiner

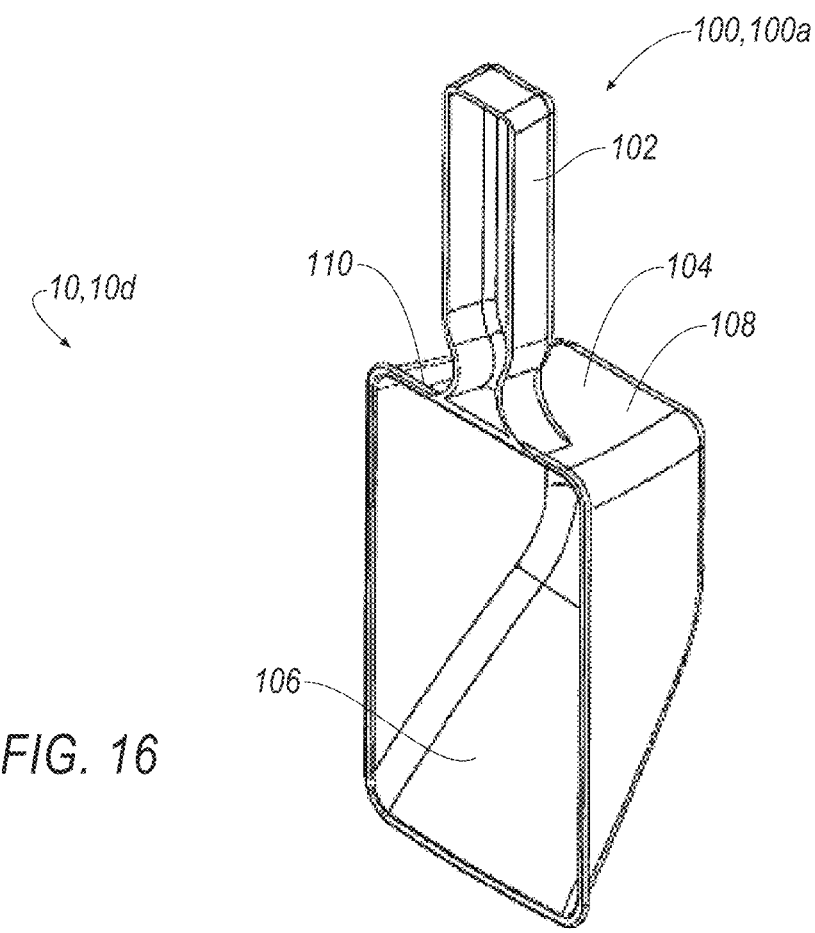
FIG. 16
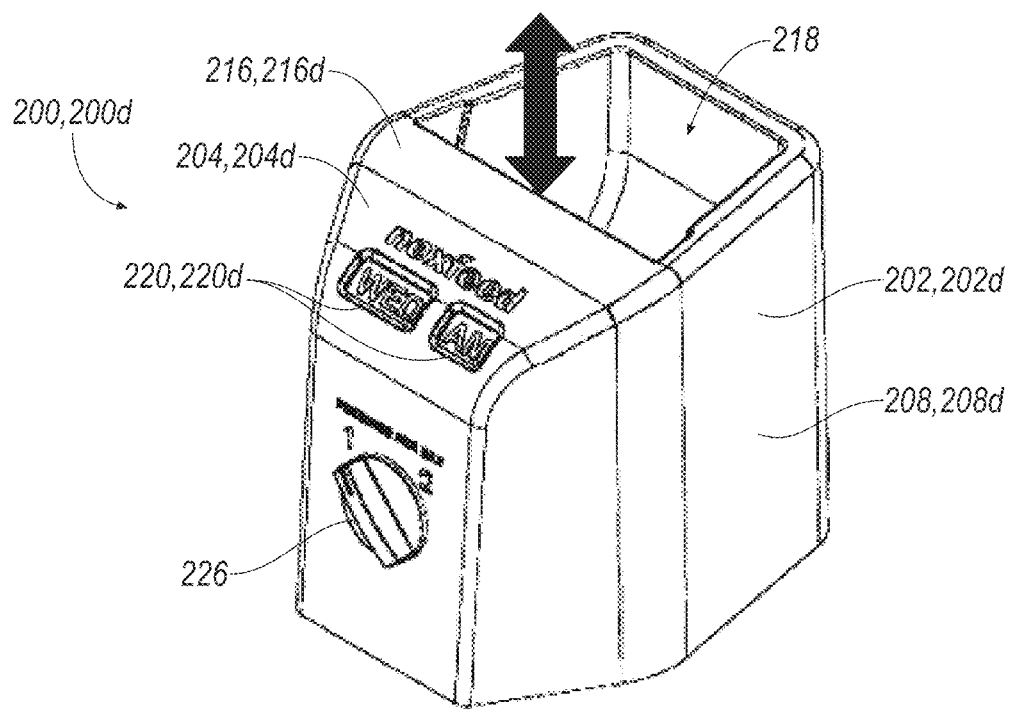

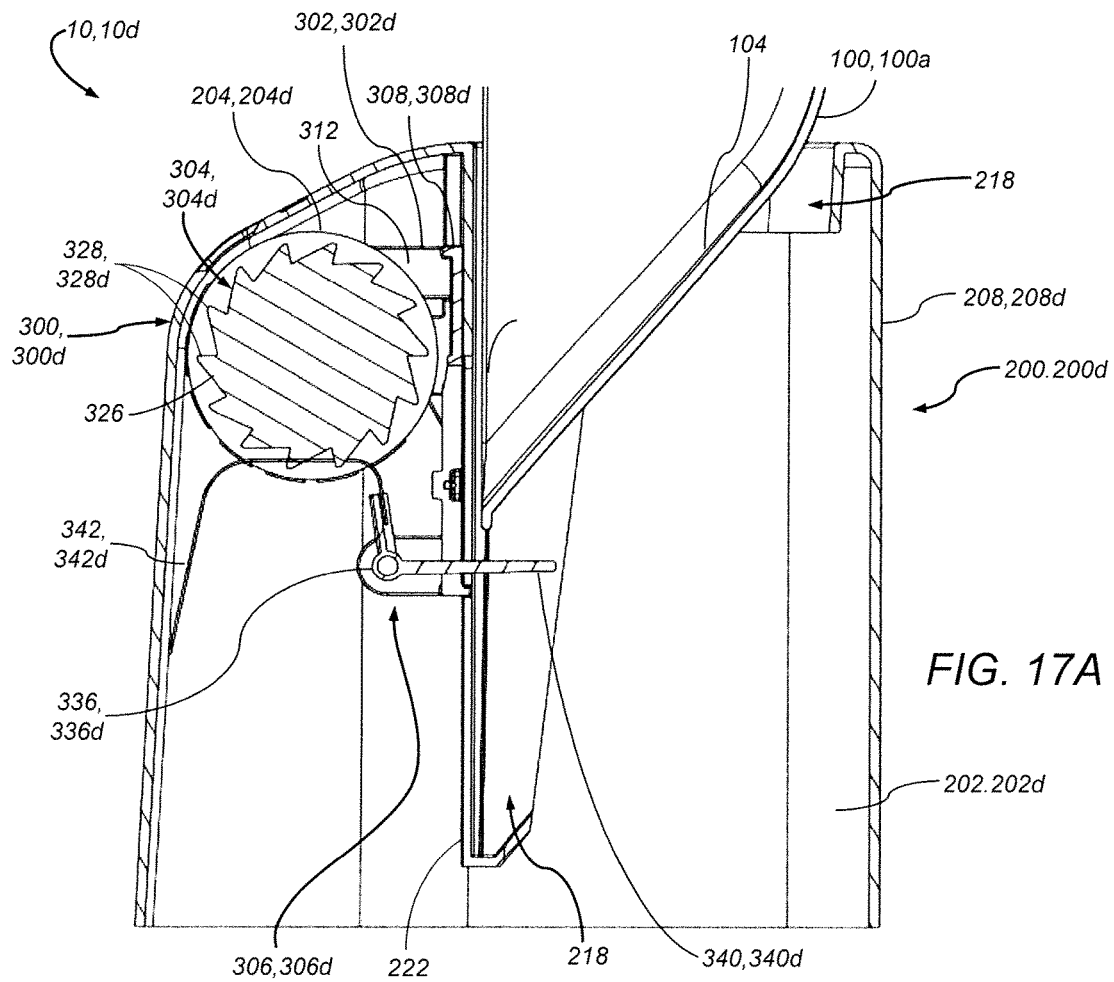
FIG. 17A
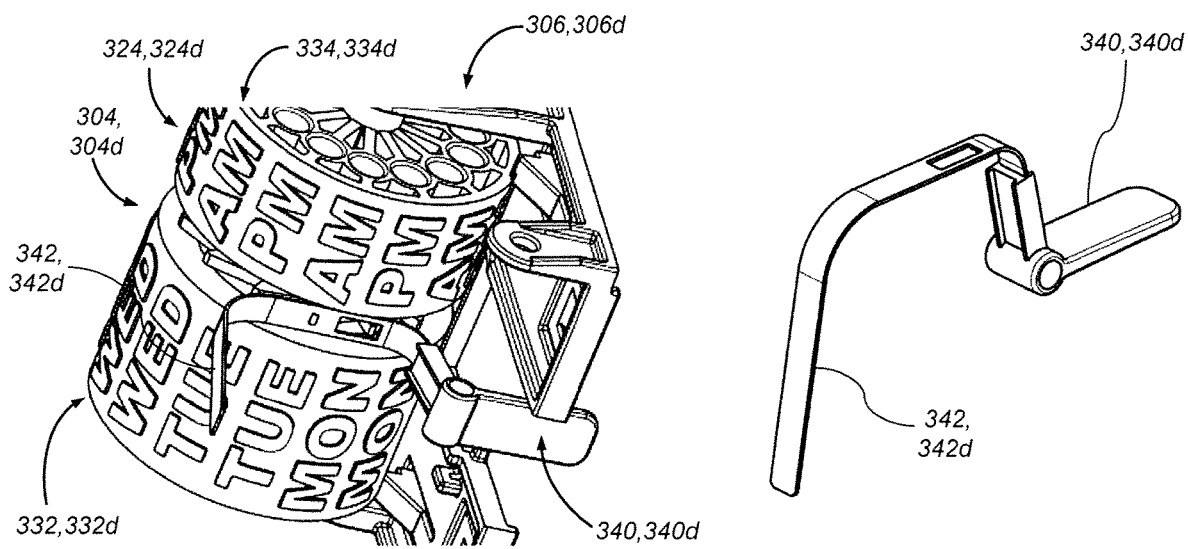
FIG. 17B
FIG. 17C

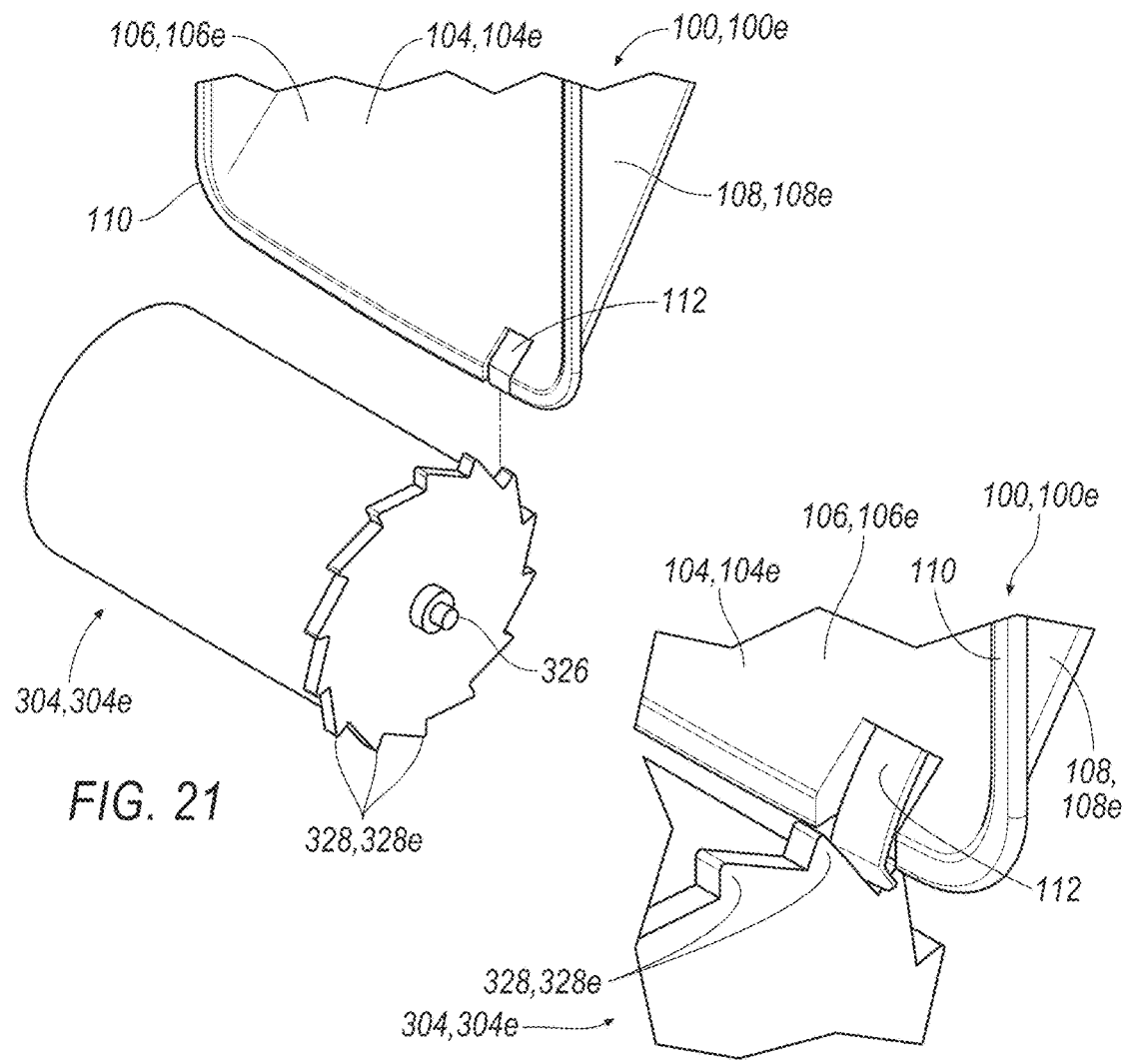
FIG. 21
FIG. 22
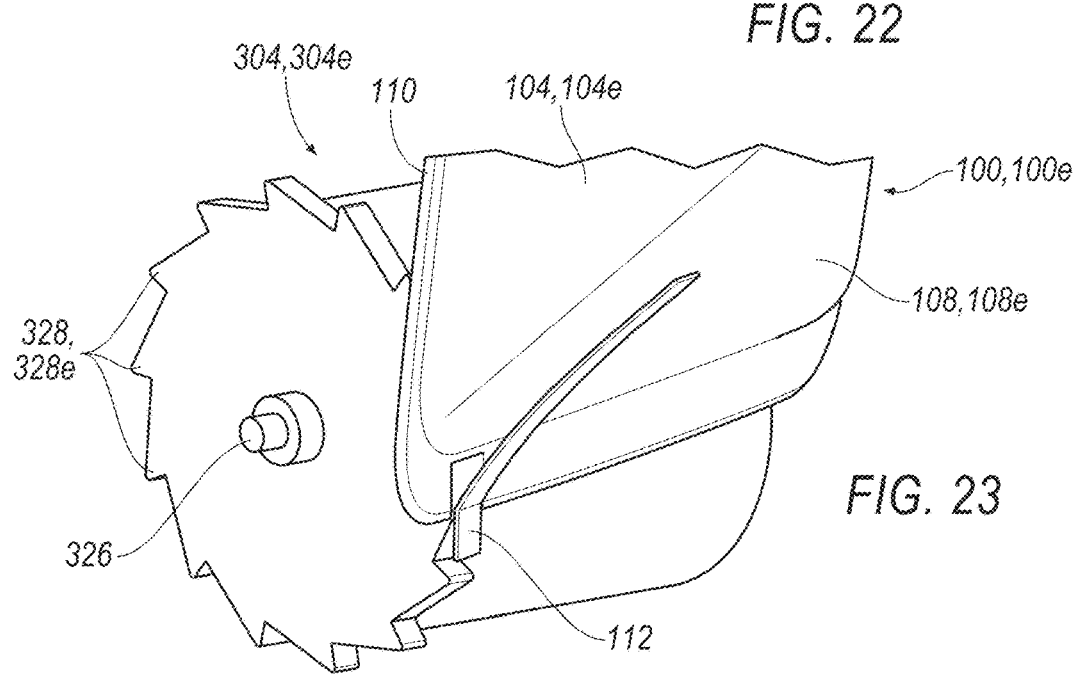
FIG. 23

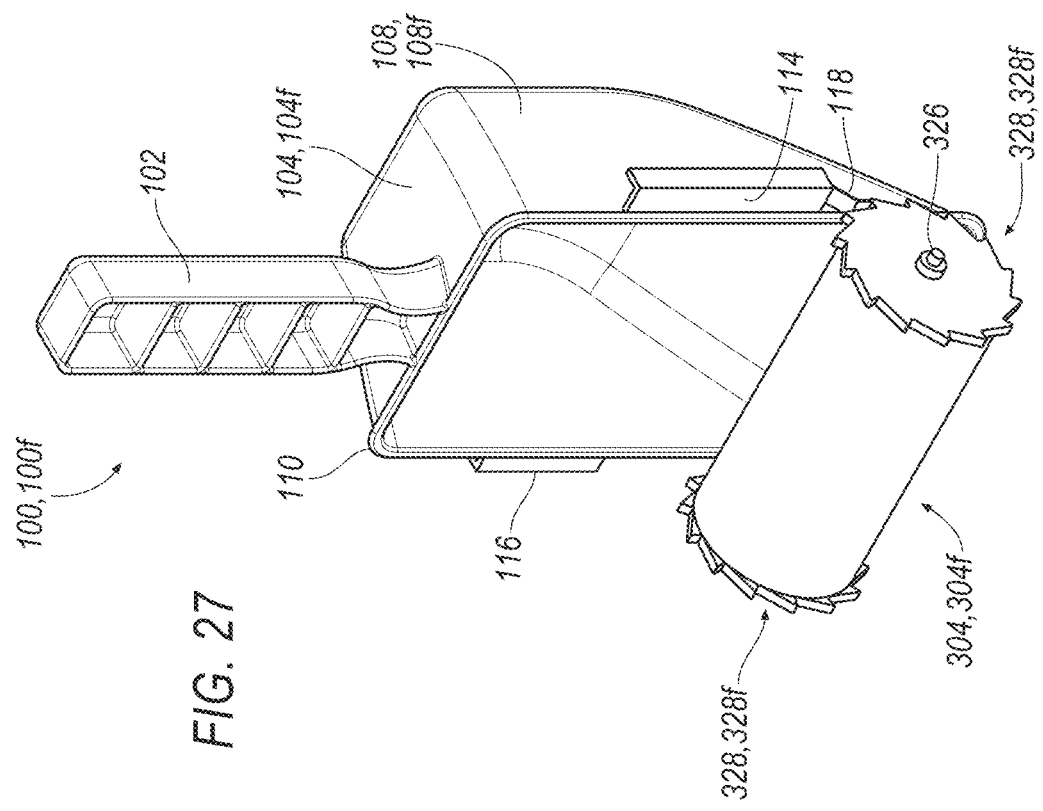
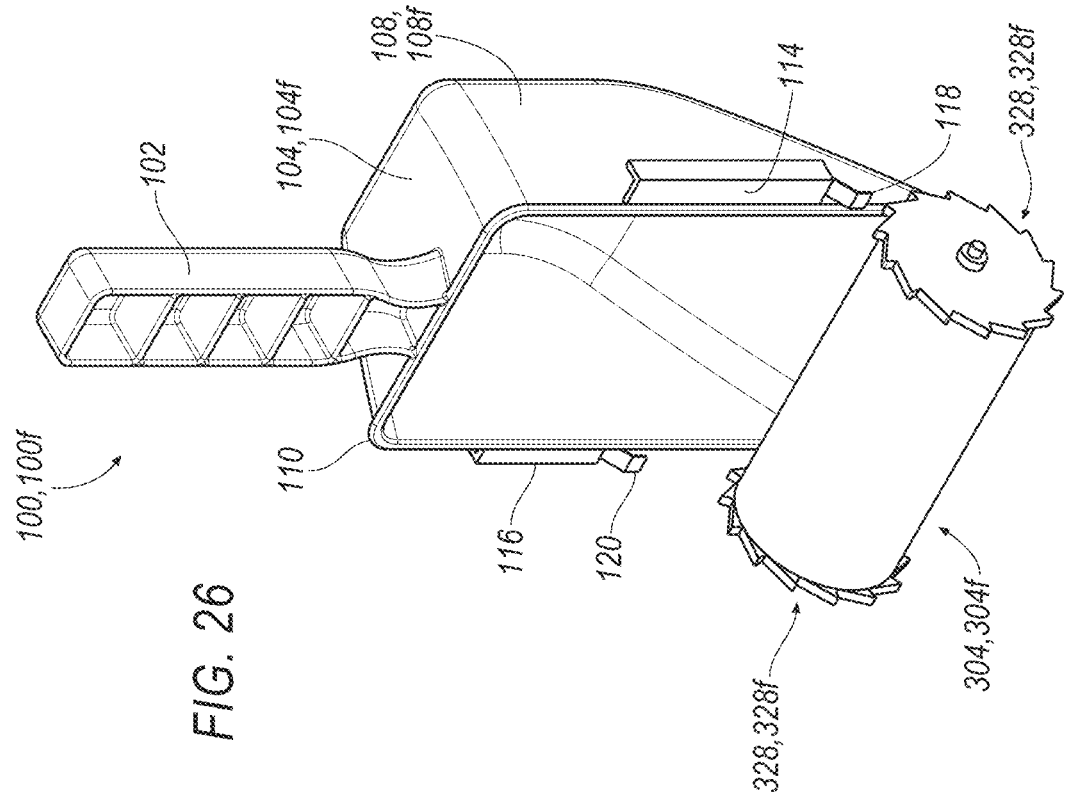

DEVICE FOR FACILITATING AND TRACKING THE FEEDING OF AN ANIMAL

CROSS REFERENCE TO RELATED APPLICATION

This application claims priority to provisional application 62/626,371 filed Feb. 5, 2018, the disclosure of which is considered part of the disclosure of this application and is hereby incorporated by reference in its entirety.

FIELD

The present disclosure relates generally to a device for facilitating feeding animals.

BACKGROUND

This section provides background information related to the present disclosure and is not necessarily prior art.

When several different people are assigned the task of caring for an animal, including feeding the animal, it may be difficult to maintain effective communications between the different people regarding when the animal was most recently fed and when the animal should be fed next. Additionally, different animals may have different feeding schedules. For example, some animals may be fed once per day, while other animals may be fed twice per day or more. Accordingly, it may be desirable to implement a device that facilitates the feeding of an animal and tracks the feeding schedule of the animal.

SUMMARY

This section provides a general summary of the disclosure, and is not a comprehensive disclosure of its full scope or all of its features.

In one implementation, an assembly for facilitating feeding an animal and tracking a feeding schedule of the animal includes a scoop, a base member, and a temporal display. The scoop includes a handle and a receptacle. The base member is configured to receive the scoop. The temporal display is attached to one of the scoop or the base member. The temporal display displays a first temporal message when the scoop is in a first orientation relative to the base member and a second temporal message when the scoop is manipulated from the first orientation to a second orientation relative to the base member.

In another implementation, an assembly for facilitating feeding an animal and tracking a feeding schedule of the animal includes a scoop having a handle and a receptacle. The assembly includes a temporal display attached to the scoop, the temporal display configured to display a plurality of temporal messages individually. The assembly includes means for manipulating the temporal display to change the temporal display from displaying one of the plurality of temporal messages when the scoop is in a first orientation to displaying another of the plurality of temporal messages when the scoop is in a second orientation.

In another implementation, an assembly for facilitating feeding an animal and tracking a feeding schedule of the animal includes a scoop having a handle and a receptacle. The assembly includes a base member defining a cavity configured to receive the scoop. The assembly includes a temporal display rotatably attached to one of the scoop or the base member. The temporal display displays a first temporal message when the scoop is exterior to the cavity and rotating to display a second temporal message when the scoop is fully inserted into the cavity.

The base member may include a cavity configured to receive the scoop, the scoop being in the first orientation relative to the base member when the scoop is exterior to the cavity and the scoop being in the second orientation relative to the base member when the scoop is fully inserted into the cavity.

The first temporal message and the second temporal message may each include a day indicator and a morning-afternoon indicator.

The temporal display may be configured to display a plurality of temporal messages individually, each of the temporal messages including a day indicator and a morning-afternoon indicator.

The plurality of temporal messages may include fourteen discrete temporal messages.

The scoop being manipulated from the first orientation to the second orientation may trigger a response from the temporal display to change from displaying the first temporal message to displaying the second temporal message.

The assembly may include an adjustment component configured to modify the response from the temporal display to change from displaying the first temporal message to displaying a third temporal message, passing over displaying the second temporal message.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 16 is a perspective view of another exemplary assembly for facilitating feeding an animal and tracking a feeding schedule of the animal, in accordance with the principles of the present disclosure;

FIG. 17A is a partial cross-sectional view of the assembly of FIG. 16;

FIG. 17B is a detailed view of a portion of the assembly of FIG. 16;

FIG. 17C is a detailed view of another portion of the assembly of FIG. 16;

FIG. 21 is a detailed view of a portion of another exemplary assembly for facilitating feeding an animal and tracking a feeding schedule of the animal, the assembly being in a first position in accordance with the principles of the present disclosure;

FIG. 22 is a detailed view of a portion of the assembly of FIG. 21 in a second position;

FIG. 23 is a detailed view of a portion of the assembly of FIGS. 21 and 22 in a third position;

FIG. 26 is a perspective view of the first implementation of the portion of the assembly of FIG. 24;

FIG. 27 is a perspective view of the second implementation of the portion of the assembly of FIG. 25;

Corresponding reference numerals indicate corresponding parts throughout the drawings.

DETAILED DESCRIPTION

Figure 1:
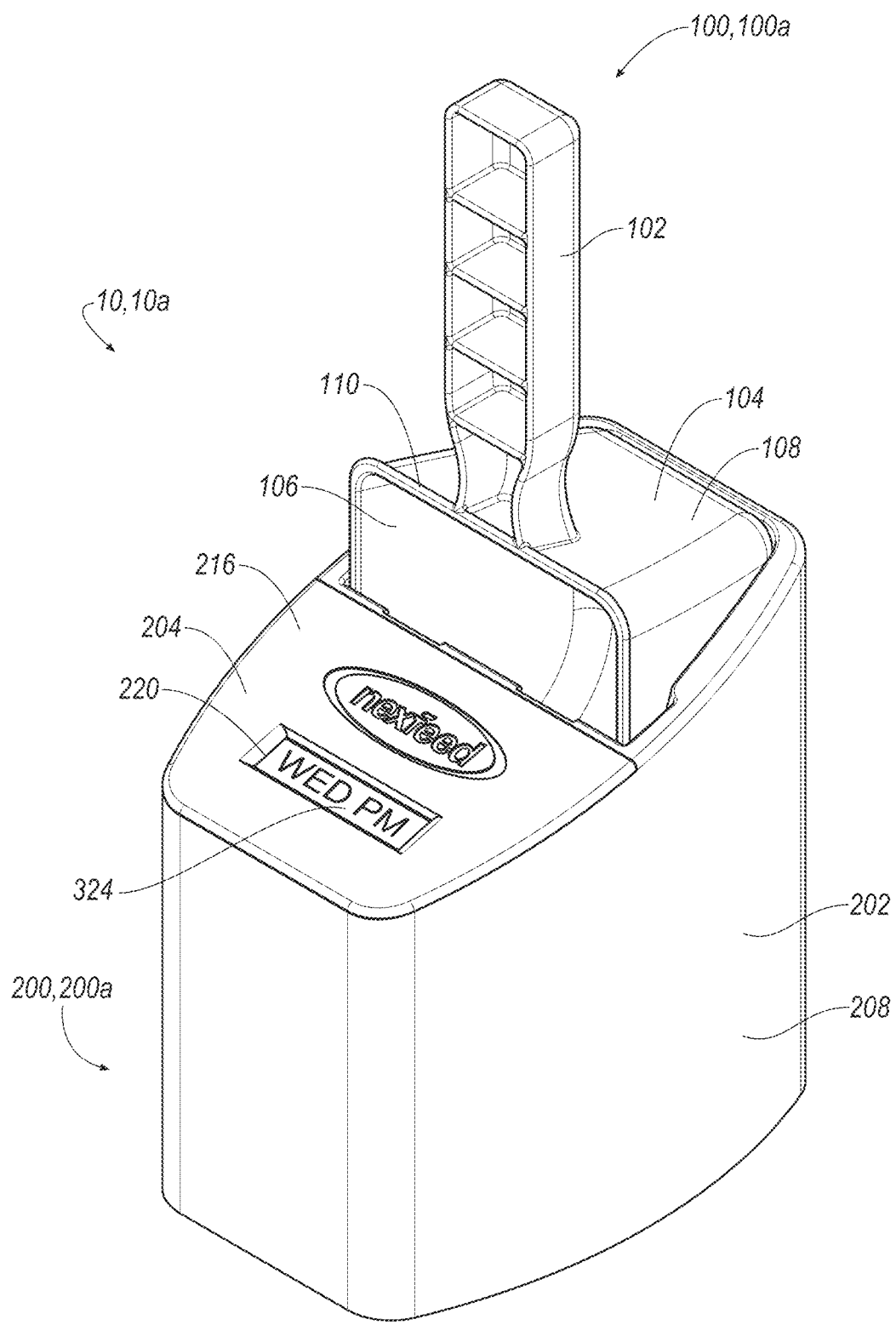
FIG. 1 is a perspective view of an exemplary assembly for facilitating feeding an animal and tracking a feeding schedule of the animal in a first orientation in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 2:
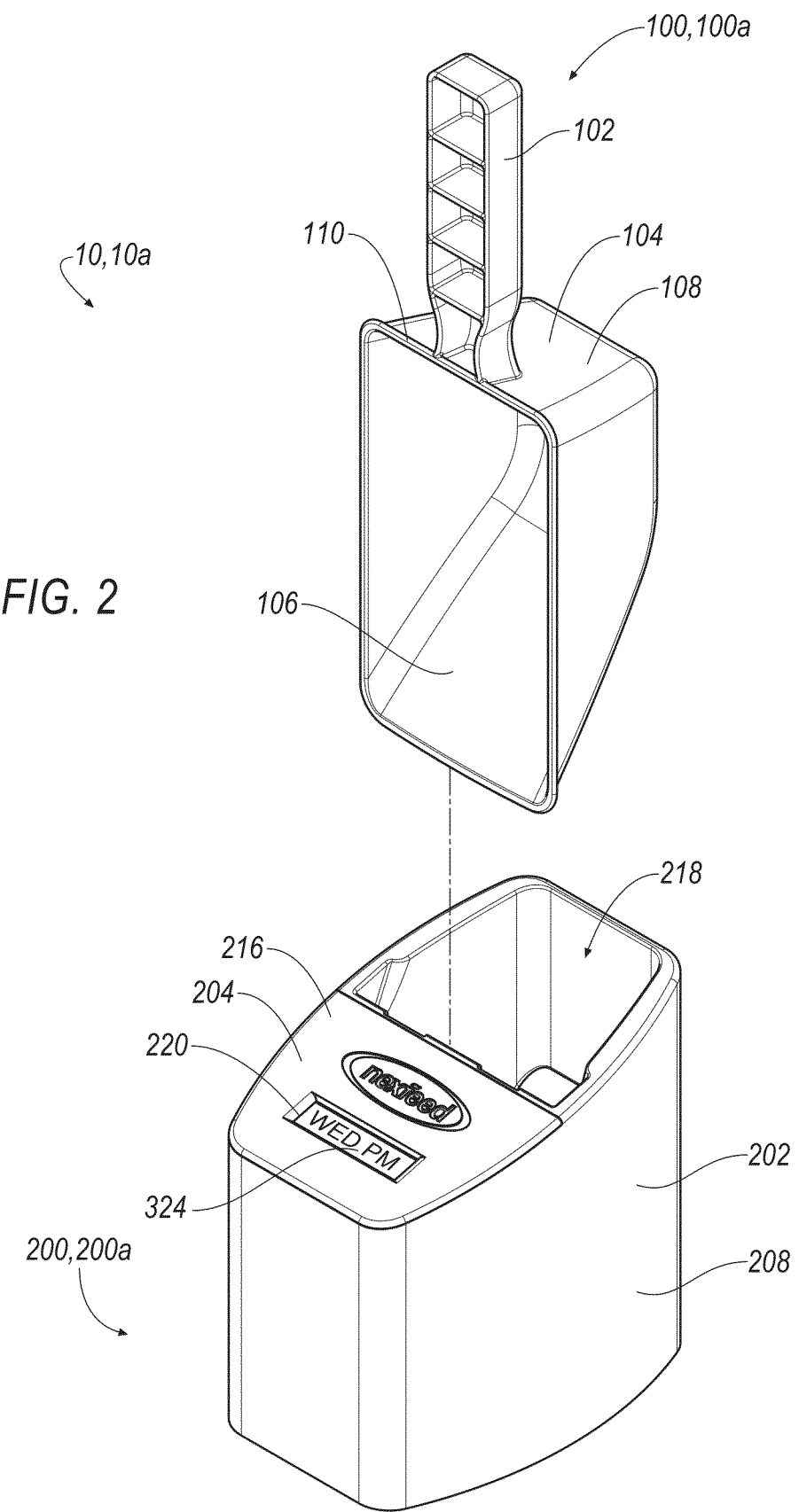
FIG. 2 is a perspective view of the assembly of FIG. 1 in a second orientation.
Figure 3:
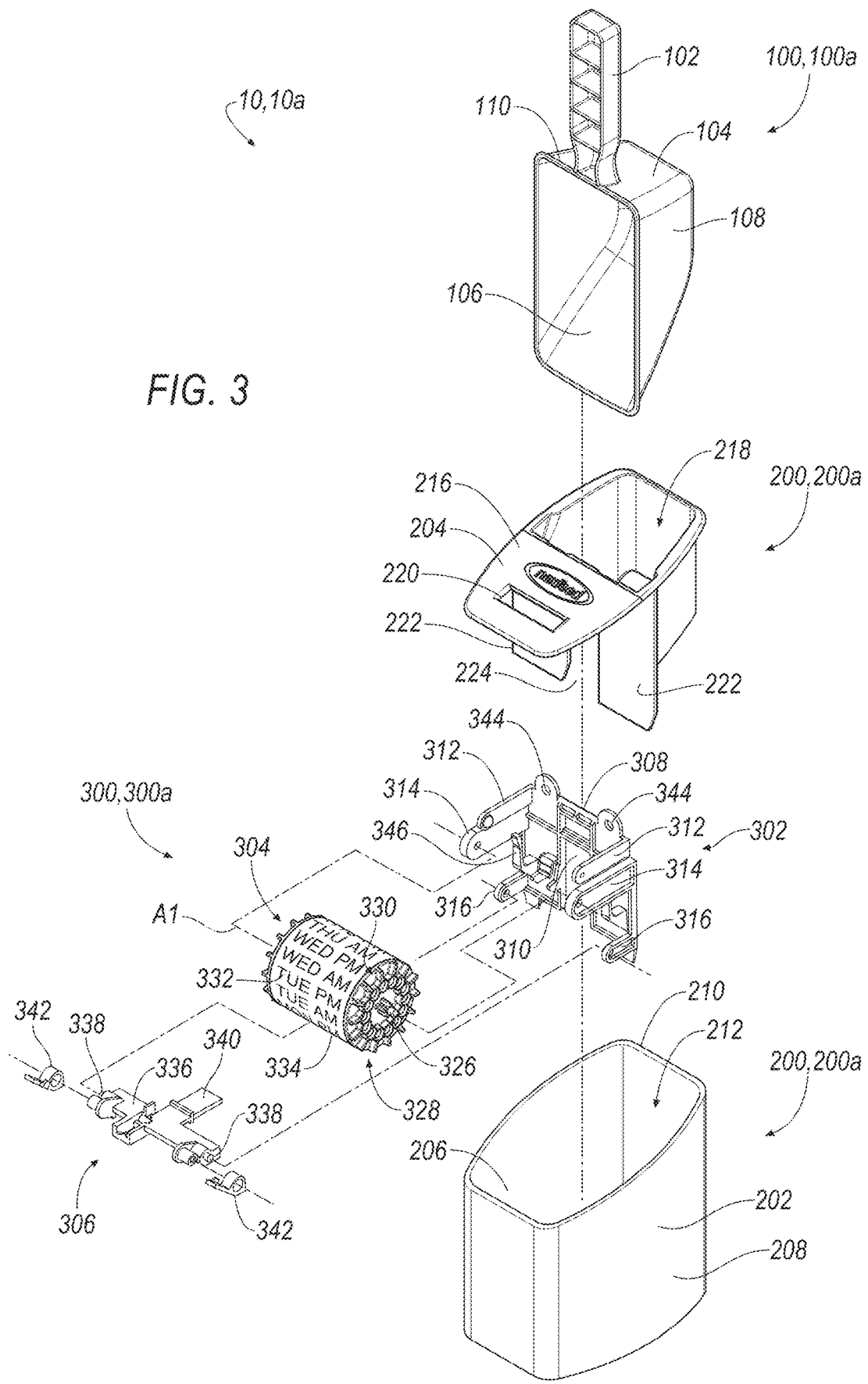
FIG. 3 is an exploded view of the assembly of FIGS. 1 and 2.
Figure 4A:
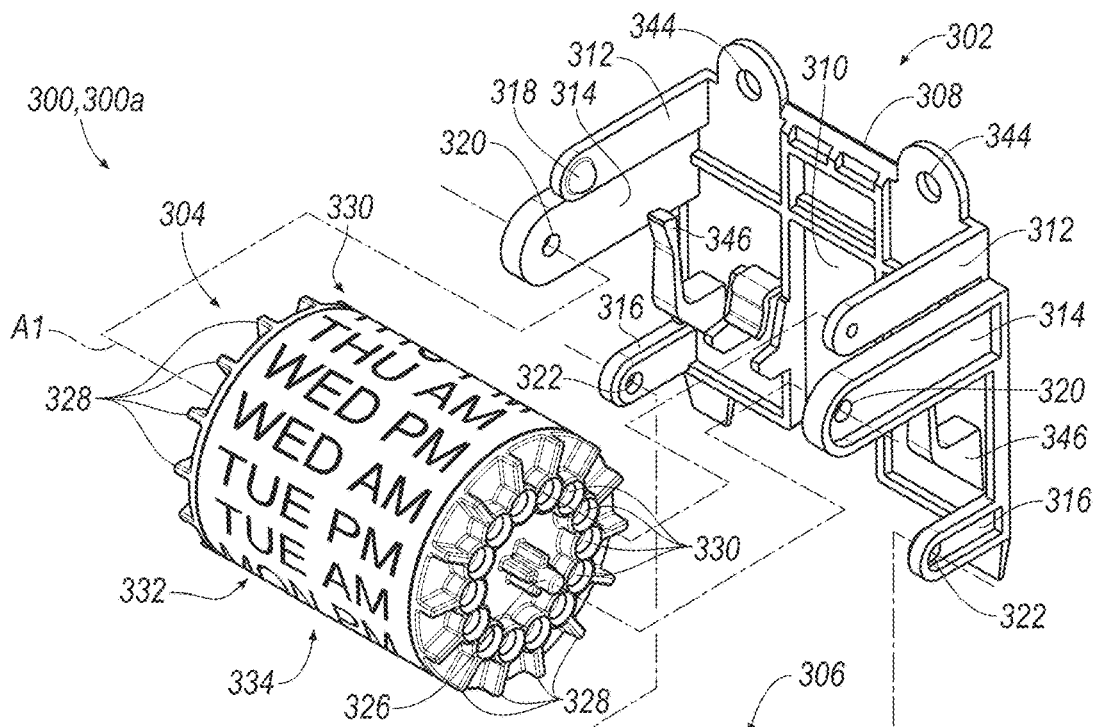
FIG. 4A is an exploded view of an exemplary display subassembly of the assembly of FIGS. 1-3.
Figure 4B:
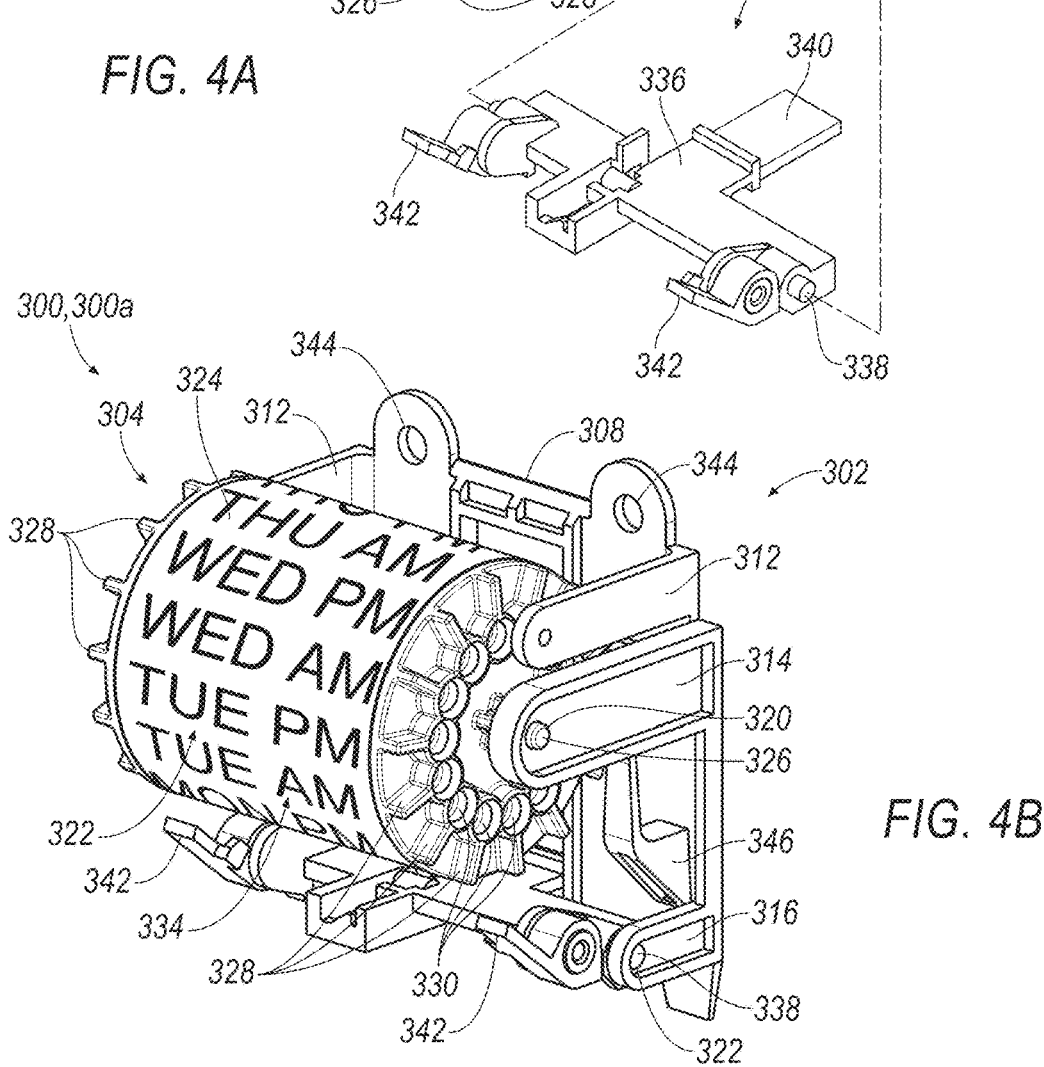
FIG. 4B is an assembled view of the display subassembly of FIG. 4A.
Figure 5:
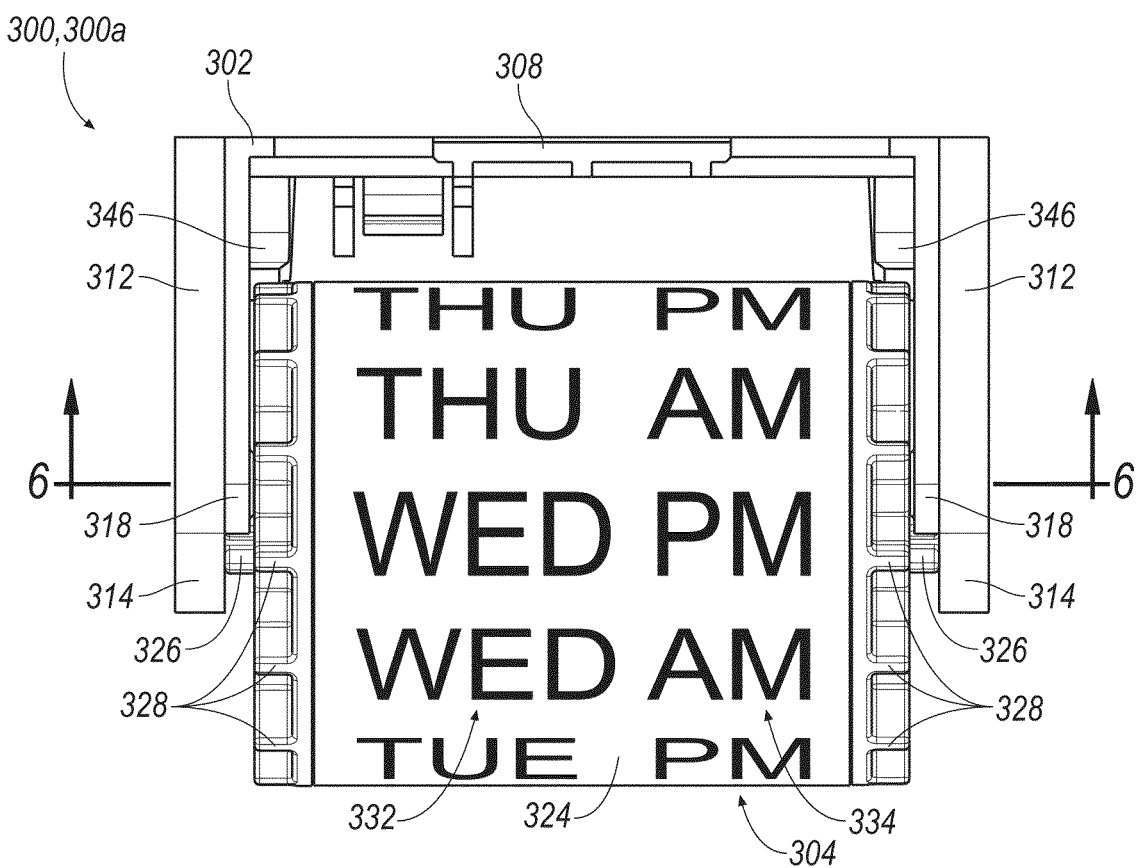
FIG. 5 is a top view of the display subassembly of FIG. 4B.
Figure 6:
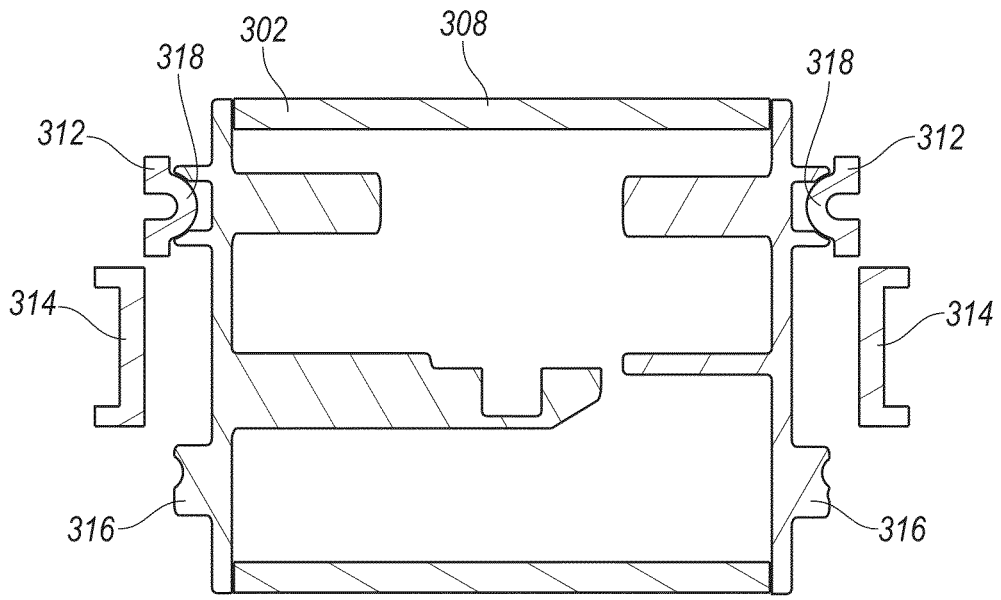
FIG. 6 is a cross-sectional view of the display subassembly of FIG. 5, taken along line 6-6.
Figure 8:
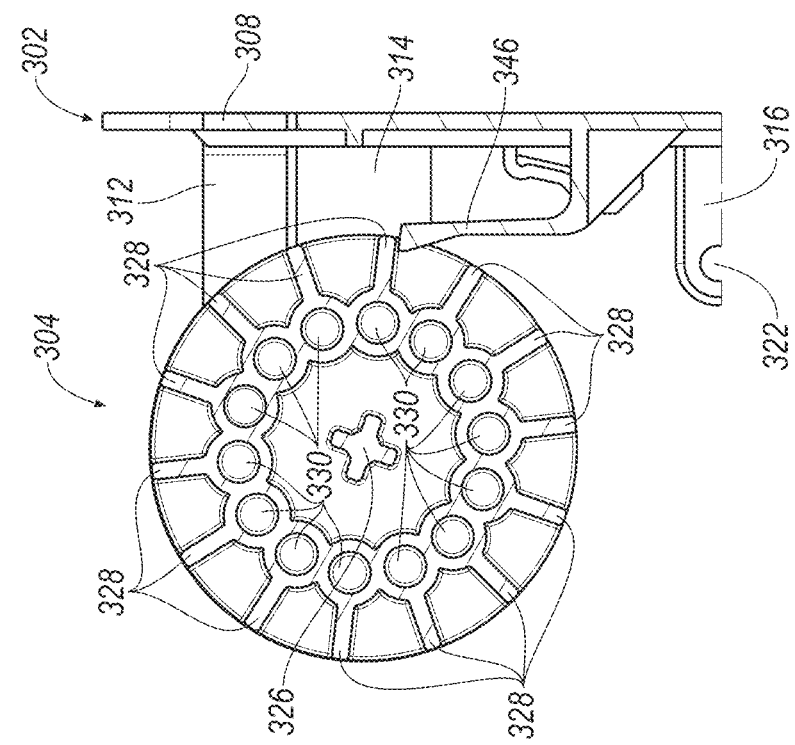
FIG. 8 is a cross-sectional view of the display subassembly of FIG. 7, taken along line 8-8.
Figure 7:
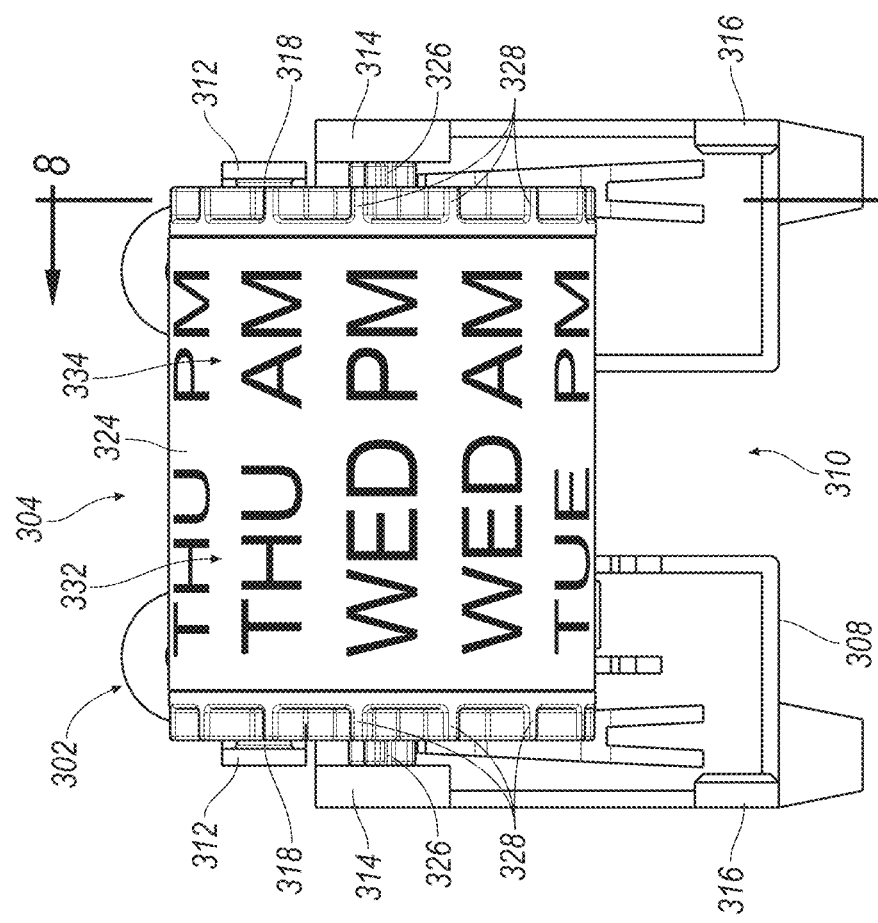
FIG. 7 is a front view of the display subassembly of FIGS. 4B and 5.

Referring to the figures, where corresponding reference numerals indicate corresponding parts, an assembly 10 for facilitating feeding an animal and tracking a feeding schedule of the animal is generally shown. As illustrated in FIG. 1-3, the assembly 10 includes a scoop 100, a base member 200, and a display subassembly 300 (FIG. 3). The scoop 100 may include a handle 102 and a receptacle 104. As will be explained in more detail below, the base member 200 may be configured to receive the scoop 100. The display subassembly 300 may include a temporal display 324 attached to one of the scoop 100 or the base member 200. The temporal display 324 displays a first temporal message when the scoop 100 is in a first orientation relative to the base member 200 and a second temporal message when the scoop is in a second orientation relative to the base member 200.

The assembly 10 may be used by a group of users, such as, for example, members of a family or animal caretakers, who commonly feed an animal, such as, for example, a domestic pet or an animal housed at a zoo or other similar facility. The scoop 100 readily facilitates feeding the animal by having the handle 102 for one of the users to hold and the receptacle 104 which may contain food for the animal, such that one of the users may use the scoop 100 to obtain a desired amount of food to feed to the animal. As will become apparent, the interaction between the scoop 100, the base member 200, and the display subassembly 300 may cause the assembly 10 to display to the group of users a current scheduled feeding time for the animal and automatically switch to displaying a next scheduled feeding time for the animal after one of the users has properly used the assembly 10 to feed the animal.

With reference to FIGS. 1-10F, the assembly 10, 10a is generally shown. The assembly 10, 10a includes the scoop 100, 100a having the handle 102 and the receptacle 104. The assembly 10, 10a includes the base member 200, 200a configured to receive the scoop 100, 100a. The assembly 10, 10a includes the display subassembly 300, 300a having the temporal display 324 attached to one of the scoop 100, 100a and the base member 200, 200a. The temporal display 324 displays a first temporal message when the scoop 100, 100a is in the first orientation (e.g., FIG. 9A or 10A) relative to the base member 200, 200a and a second temporal message when the scoop is in the second orientation (e.g., FIGS. 9F and 10F) relative to the base member 200, 200a.

The scoop 100, 100a includes the handle 102 attached to the receptacle 104. For example, the receptacle 104 may include an inner surface 106 configured to receive and contain food, such as, for example, dry food or kibble. The receptacle 104 may include an outer surface 108 opposite the inner surface 106, and the handle 102 may be attached to the outer surface 108. The receptacle 104 may include a peripheral edge 110 extending from the inner surface 106 to the outer surface 108. The scoop 100, 100a may be formed of any suitable material, such as, for example, a plastic, a metal, a polymer, etc. The scoop 100, 100a may have any suitable level of transparency and may include measurement indicators (not shown) in the receptacle 104.

With reference to FIG. 3, the base member 200, 200a may include a base 202 and a top 204 selectively engageable with the base 202 between an assembled configuration (FIG. 1) and an unassembled configuration (FIG. 3). As another example, the base 202 and the top 204 may be integral with each other, i.e., integrally formed as a single component. The base 202 may include an inner surface 206, an outer surface 208 opposite the inner surface 206, and a peripheral edge 210 extending from the inner surface 206 to the outer surface 208. The base 202, e.g., the inner surface 206, may define a main cavity 212 configured to receive the top 204. For example, the main cavity 212 may have a size and a shape designed to receive the top 204.

The top 204 may have a peripheral edge 214 that aligns with the peripheral edge 210 of the base 202, for example, the outer surface 208 of the base 202 and the peripheral edge 210 of the top 204 may be substantially flush with one another in the assembled configuration. The top 204 may include a top surface 216 facing away from the main cavity 212 in the assembled configuration. The top surface 216 may define a scoop-receiving cavity 218 extending into the main cavity 212. The scoop-receiving cavity 218 may be configured to receive the scoop 100, 100a, i.e., the receptacle 104 of the scoop 100, 100a. The top surface 216 may define a display aperture 220, which may have a generally rectangular shape. The top surface 216 may include a logo or any other suitable symbol. The top 204 may include a wall 222 extending into the main cavity 212 in the assembled configuration and the wall 222 may define a slot 224.

The scoop 100, 100a and the base member 200, 200a may be movable between the first orientation—when the scoop 100, 100a is exterior to the scoop-receiving cavity 218, as shown in FIG. 2—and the second orientation—when the scoop 100, 100a is fully inserted into the scoop-receiving cavity 218, as shown in FIG. 1. The scoop 100, 100a may be fully inserted into the scoop-receiving cavity 218 when the receptacle 104 substantially fills the scoop-receiving cavity 218. In the second orientation, the peripheral edge 110 of the scoop 100, 100a may be adjacent to the wall 222 of the base member 200, 200a. The base member 200, 200a may be formed of any suitable material, such as, for example, a plastic, a metal, a polymer, etc.

With reference to FIGS. 3-7, the display subassembly 300, 300a may include a bracket 302, a wheel 304, and a drive component 306. The bracket 302 may include a body 308 defining a slot 310 and apertures 344. The slot 310 may align with the slot 224 in the wall 222 of the base member 200, 200a. The apertures 344 may align with corresponding apertures (not shown) in the base member 200, 200a, e.g., in the wall 222. The apertures 344 may receive a mechanical fastener, such as, for example, a screw, a tree fastener, or any other suitable mechanical fastener, to secure the bracket 302 to the base member 200, 200a.

The bracket 302 may include a pair of flex arms 312, a pair of spin arms 314, a pair of pivot arms 316, and a pair of pawls 346, each extending from the body 308 in a direction facing away from the scoop-receiving cavity 218 in the assembled configuration. The flex arms 312, spin arms 314, pivot arms 316, and pawls 346 may extend substantially parallel to one another, for example, each arm 312, 314, 316 and the pawls 346 may extend substantially perpendicular, i.e., at a ninety degree angle, to the body 308. The flex arms 312 may flex relative to the body 308. For example, the flex arms 312 may be spaced from and across from each other, and each flex arm 312 may flex relative to the body 308 closer to and further away from each other. The spin arms 314 and the pivot arms 316 may be substantially rigid relative to the body 308. Each flex arm 312 may include a protrusion 318 near a distal end of each flex arm 312. Each spin arm 314 may include an aperture 320 near a distal end of each spin arm 314. Each pivot arm 316 may include an aperture 322 near a distal end of each pivot arm. Each pawl 346 may flex relative to the body 308, e.g., each pawl 346 may flex toward and away from the body 308.

With continued reference to FIGS. 3-7, the display subassembly 300, 300a may include a wheel 304 which includes the temporal display 324. The wheel 304 may include a spindle 326 extending through a center of the wheel 304. The wheel 304 may include a plurality of teeth 328 and a plurality of depressions 330. The teeth 328 and the depressions 330 may each extend radially around the center of the wheel 304, such that the teeth 328 and the depressions 330 are collectively disposed circumferentially about the center (e.g., a rotational axis A1) of the wheel. The number of teeth 328 may equal the number of depressions 330, for example, there may be fourteen teeth 328 and fourteen depressions 330. It should be understood that there may be any suitable number of teeth 328 and depressions 330. As one example, each of the teeth 328 may extend outwardly (e.g., radially) from each of the depressions 330 and longitudinally (e.g., in a direction substantially parallel to the axis A1) from the wheel 304. Alternatively, the teeth 328 and the depressions 330 may be arranged in any suitable configuration.

The spindle 326 may engage the apertures 320 of the spin arms 314 to allow the wheel 304 to rotate or spin about the axis A1 relative to the bracket 302. Each of the protrusions 318 of the flex arms 312 may engage one of the depressions 330 of the wheel 304, inhibiting rotation of the wheel 304 relative to the bracket 302. As will become apparent, as the wheel 304 rotates during operation of the assembly 10, 10a, the flex arms 312 may flex away from each other, thus, allowing each of the protrusions 318 to disengage one of the depressions 330, and then the flex arms 312 may flex toward each other, thus, allowing each of the protrusions 318 to engage another of the depressions 330.

The pawls 346 of the bracket 302 may engage the teeth 328 of the wheel 304, thus, inhibiting rotation of the wheel 304 relative to the bracket 302. As will become apparent, as the wheel 304 rotates during operation of the assembly 10, 10a, the pawls 346 may flex away from the wheel 304, i.e., toward the body 308, thus, allowing each pawl 346 to disengage with one of the teeth 328, and then the pawls 346 may flex toward the wheel 304, i.e., away from the body 308, thus, allowing each pawl 346 to engage another of the teeth 328.

The temporal display 324 may display a plurality of temporal messages including a plurality of day indicators 332 and a plurality of morning-afternoon indicators 334. For example, the day indicators 332 may include each day of the week, i.e., "Sunday", "Monday", "Tuesday", "Wednesday", "Thursday", "Friday", and "Saturday". As another example, the day indicators 332 may include shortened versions of each day of the week, i.e., "SUN," "MON," "TUE," "WED," "THU," "FM," and "SAT." The morning-afternoon indicators 334 may include "AM" and "PM." As shown in the figures there may be fourteen discrete temporal messages, i.e., a morning and an afternoon for each of the seven days of the week. Each of the teeth 328 and depressions 330 may correspond to a corresponding temporal message which includes one of the day indicators 332 and one of the morning-afternoon indicators. For example, there may be fourteen teeth 328 and depressions 330, each tooth 328 and depression 330 corresponding to one of the fourteen discrete temporal messages. As another example, there may be any suitable number of temporal messages. As yet another example, the temporal messages may include a time indicator, a countdown timer, or any other suitable temporal indicator.

With reference to FIGS. 1-3, each of the temporal messages of the temporal display 324 may be displayed through the display aperture 220 of the base member 200, 200a. For example, the display aperture 220 may be configured to individually display one of the day indicators 332 and one of the morning-afternoon indicators 334 and cover up the rest of the day indicators 332 and the morning-afternoon indicators 334, as seen in FIGS. 1 and 2.

The temporal display 324, including the day indicators 332 and morning-afternoon indicators 334, may indicate a current scheduled feeding time for the animal. For example, if the temporal display 324 displayed a day indicator 332 of "WED" and a morning-afternoon indicator 334 of "PM," as shown in FIGS. 1 and 2, then the current scheduled feeding time for the animal would be equal to Wednesday afternoon.

With reference to FIGS. 3-7, the display subassembly 300, 300a may include a drive component 306 having a body 336. The drive component 306 may include a spindle 338 extending through the body 336 and the spindle 338 may engage with the apertures 322 of the pivot arms 316 to allow the drive component 306 to pivot or rotate relative to the bracket 302. The drive component 306 may include a lever arm 340 and a pair of drive arms 342, the lever arm 340 being disposed on a side of the body 336 opposite the drive arms 342. For example, in the assembled configuration, the lever arm 340 may extend through the slot 310 of the bracket 302, through the slot 224 of the base member 200, 200a, and into the scoop-receiving cavity 218. The drive arms 342 may be disposed on the opposite side of the wall 222 of the base member 200, 200a.

The body 336 may form a lever relationship relative to the bracket 302, the lever having a fulcrum at the connection of the spindle 338 and the apertures 322 of the pivot arms 316. In the lever relationship, as the lever arm 340 moves in one direction relative to the bracket 302, the drive arms 342 may move in an opposite direction relative to the bracket 302. For example, if the lever arm 340 moves down, the drive arms 342 move up, and vice versa. As will become apparent, the lever arm 340 may be configured to engage or receive the scoop 100, 100a and the drive arms 342 may be configured to engage with the teeth 328 of the wheel 304. The lever arm 340 may include a selectively removable extender 348, which may be selectively attached or removed to the lever arm 340 to modify the relationship between the lever arm 340 and the scoop 100, 100a.

Figure 9A:
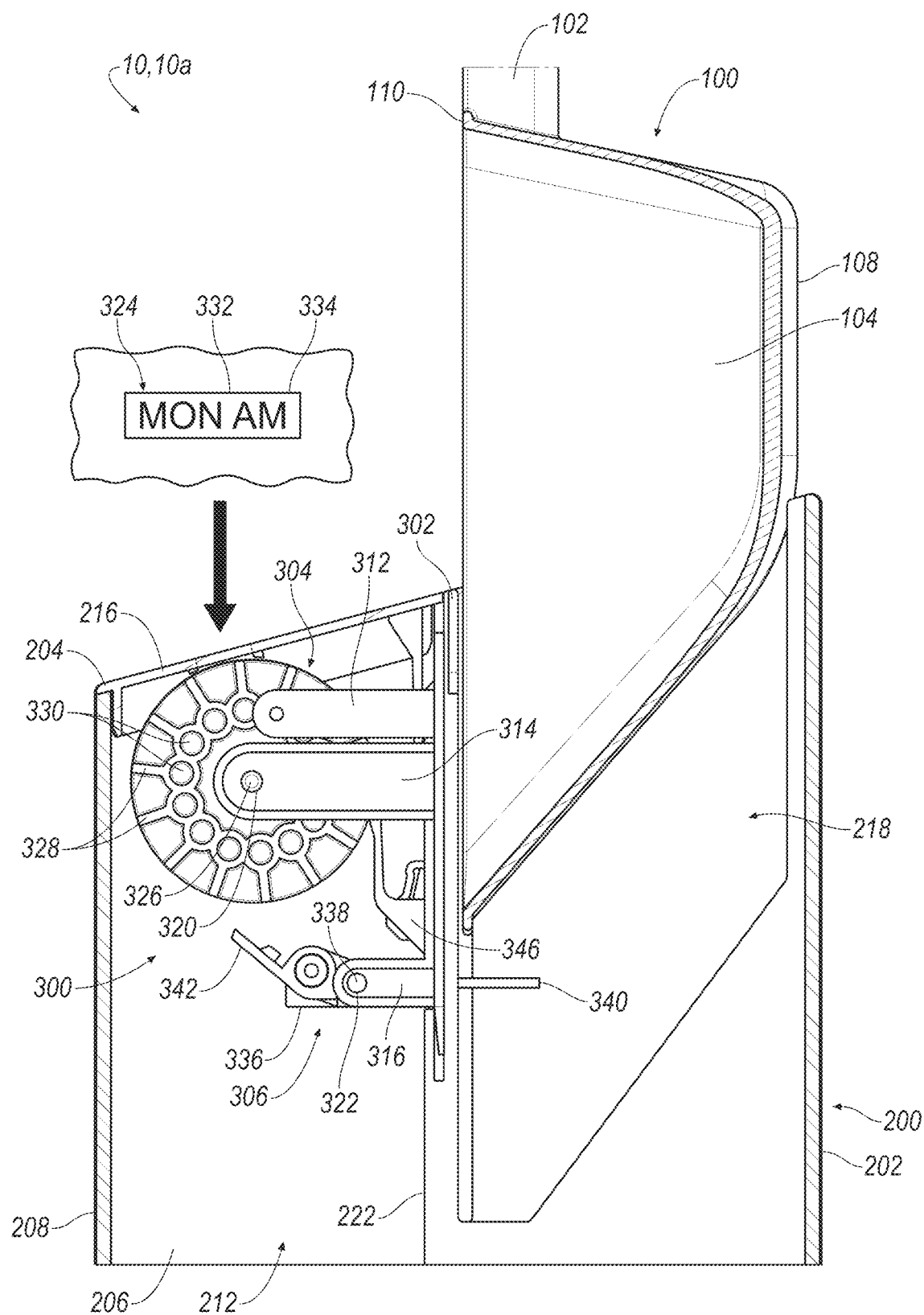
FIG. 9A is a partial cross-sectional view of the assembly of FIGS. 1-3 in a first position.
Figure 9B:
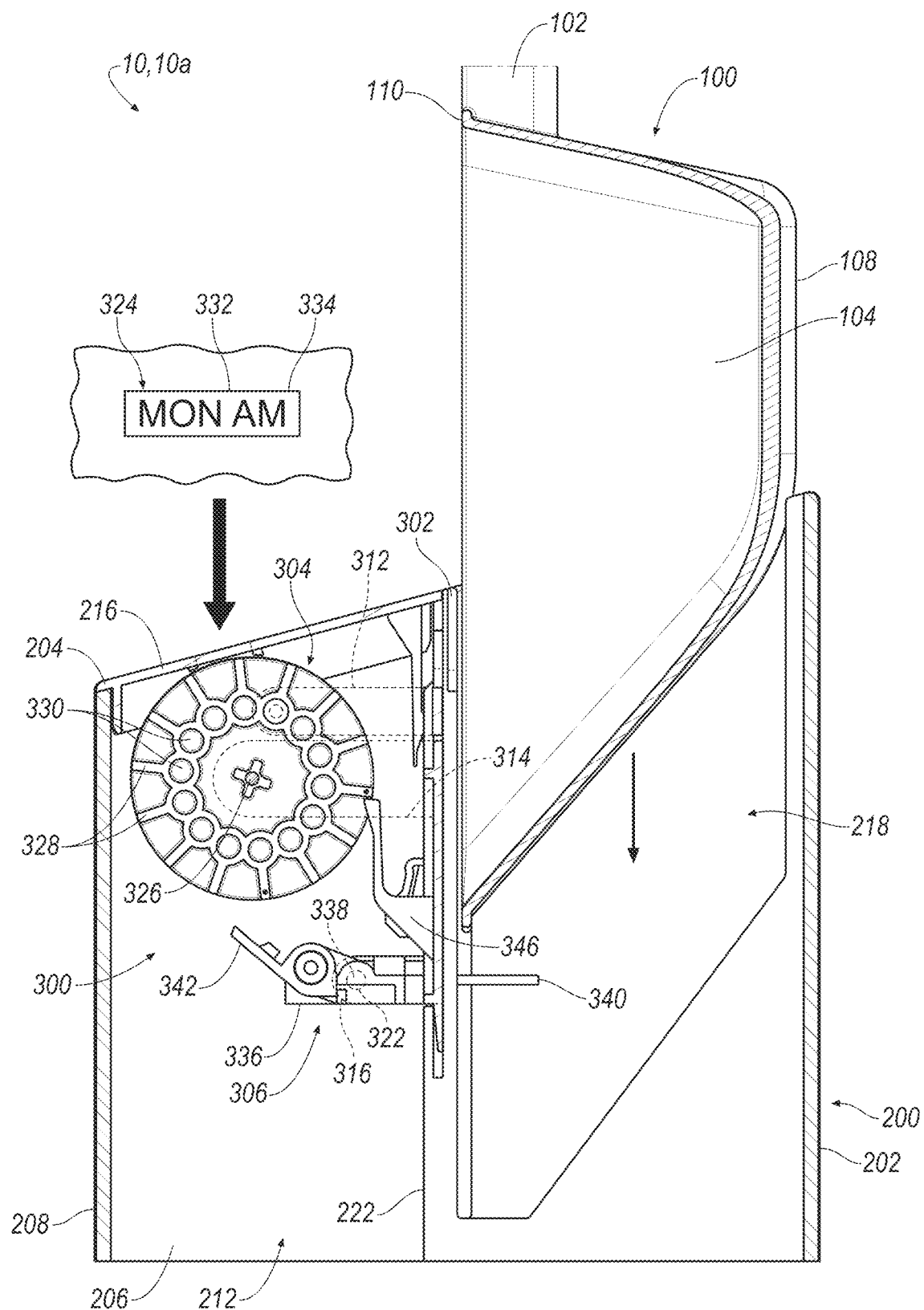
FIG. 9B is a partial cross-sectional view of the assembly of FIGS. 1-3 in the first position.
Figure 9C:
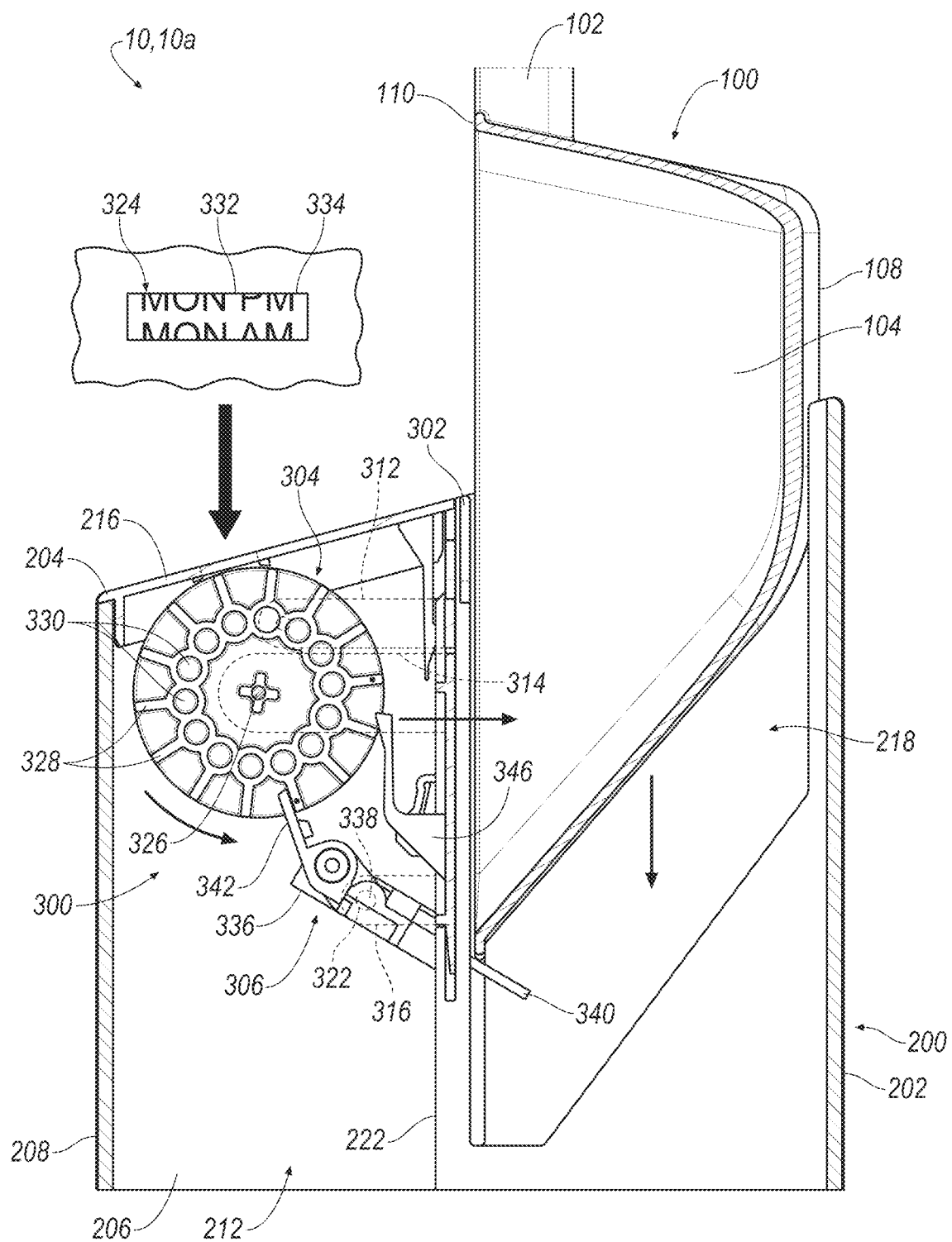
FIG. 9C is a partial cross-sectional view of the assembly of FIGS. 1-3 in a second position.

In light of the foregoing, the operation of the assembly 10, 10a will be discussed with specific reference to FIGS. 9A-F. As shown in FIGS. 9A and 9B, the scoop 100, 100a may be positioned in the first orientation relative to the base member 200, 200a, and the temporal display 324 may display a day indicator 332 of "MON" and a morning-afternoon indicator 334 of "AM," corresponding to a current scheduled feeding time for the animal equal to Monday morning. As shown in FIGS. 9B and 9C, as the scoop 100, 100a moves further into the scoop receiving cavity 218, the scoop 100, 100a, e.g., the peripheral edge 110 of the scoop 100, 100a, engages with the lever arm 340. As the scoop 100, 100a exerts a force along a first direction upon the lever arm 340, the drive component 306 pivots at the connection between the spindle 338 and the apertures 322 of the pivot arms 316. This causes the drive arms 342 to move in a second direction opposite to the first direction of the force until the drive arms 342 engage one of the teeth 328, as shown in FIG. 9C.

Figure 9D:
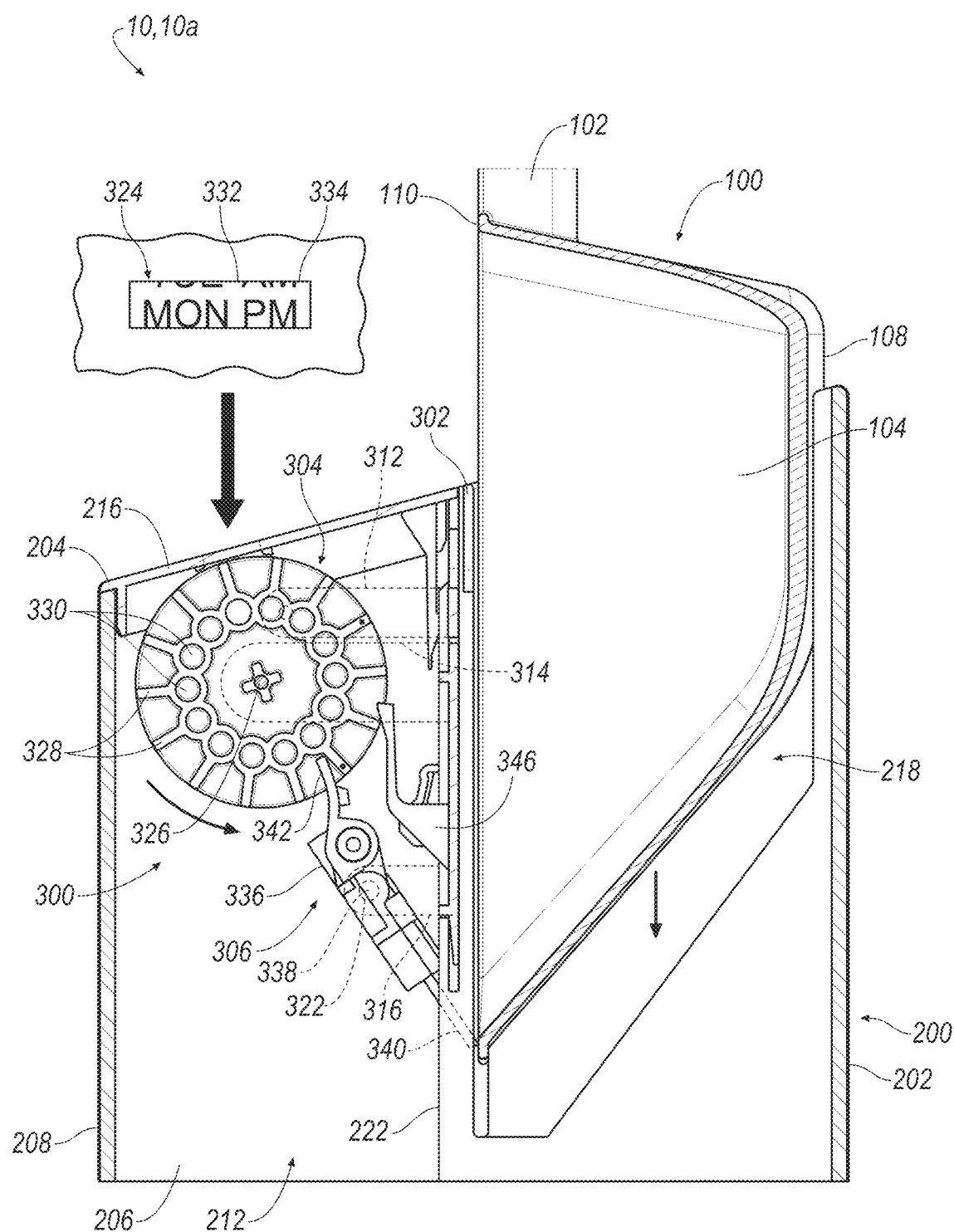
FIG. 9D is a partial cross-sectional view of the assembly of FIGS. 1-3 in a third position.
Figure 9E:
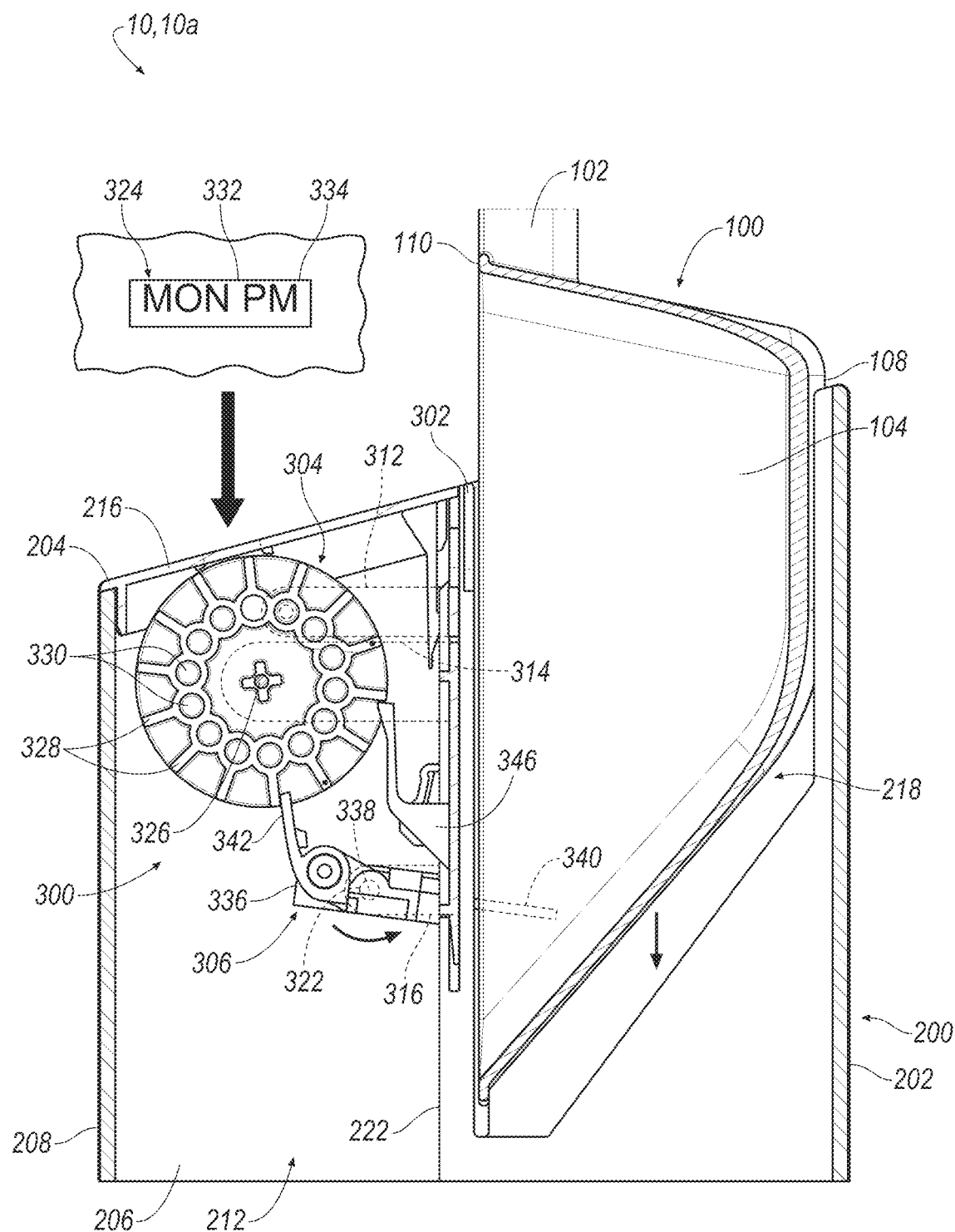
FIG. 9E is a partial cross-sectional view of the assembly of FIGS. 1-3 in a fourth position.

The force of the scoop 100, 100a upon the lever arm 340 is transmitted through the body 336 of the drive component 306, and the drive arms 342 engage the teeth 328, causing the wheel 304 to spin, in a counterclockwise direction as shown in FIGS. 9C and 9D, at the connection between the spindle 326 and the apertures 320 of the spin arms 314. As the wheel 304 spins, the protrusions 318 disengage from a first pair of the depressions 330, and the pawls 346 disengage from a first pair of the teeth 328.

The scoop 100, 100a continues to exert the force upon the lever arm 340, until the peripheral edge 110 is below the lever arm 340 and the lever arm 340 is extending into the receptacle 104 of the scoop 100, 100a. At this point, the wheel 304 rotates slightly back in an opposite direction, i.e., in a clockwise direction as shown between FIGS. 9D and 9E. Here, the protrusions 318 engage a second pair of the depressions 330 adjacent to the first pair of the depressions 330, and the pawls 346 engage a second pair of teeth 328 adjacent to the first pair of teeth 328. At this point, the scoop 100, 100a is positioned in the second orientation, i.e., the scoop 100, 100a is fully inserted into the scoop-receiving cavity 218.

Figure 9F:
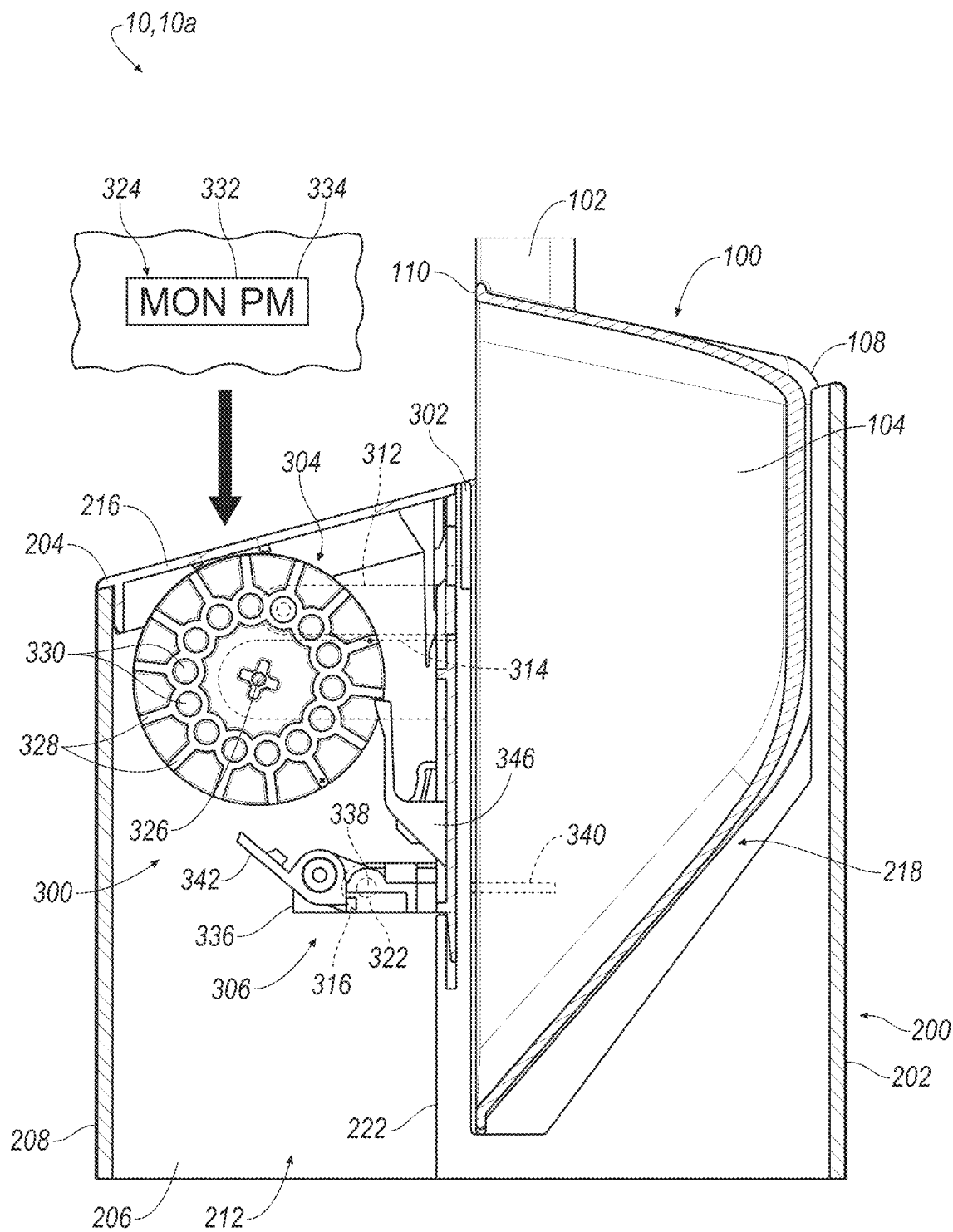
FIG. 9F is a partial cross-sectional view of the assembly of FIGS. 1-3 in a fifth position.

As shown in FIG. 9F, the temporal display 324 changed such that the day indicator 332 displays "MON" and the morning-afternoon indicator 334 displays "PM," corresponding to a next scheduled feeding time for the animal equal to Monday afternoon. That is, the scoop 100, 100a being manipulated from the first orientation to the second orientation triggered a response from the temporal display 324 to change from displaying a first temporal message (as shown in FIG. 9A) to displaying a second temporal message (as shown in FIG. 9F).

As set forth above, the assembly 10, 10a may be properly used to facilitate feeding of the animal by removing the scoop 100, 100a from the base member 200, 200a, using the scoop 100, 100a to scoop and deliver food to a dish of the animal, and subsequently returning the scoop 100, 100a to the base member 200, 200a by fully inserting the scoop 100, 100a into the scoop-receiving cavity 218.

The operation of the assembly 10, 10a with respect to FIGS. 10A-F may be substantially similar to the foregoing description with respect to FIGS. 9A-F, apart from any exceptions described below and/or shown in the Figures. Accordingly, the structure and/or function of similar features will not be described again in detail. In addition, like reference numerals are used hereinafter and in the drawings to identify like features. The noted addition to the assembly 10, 10a shown in FIGS. 10A-F is the extender 348 attached to the lever arm 340.

Figure 10A:
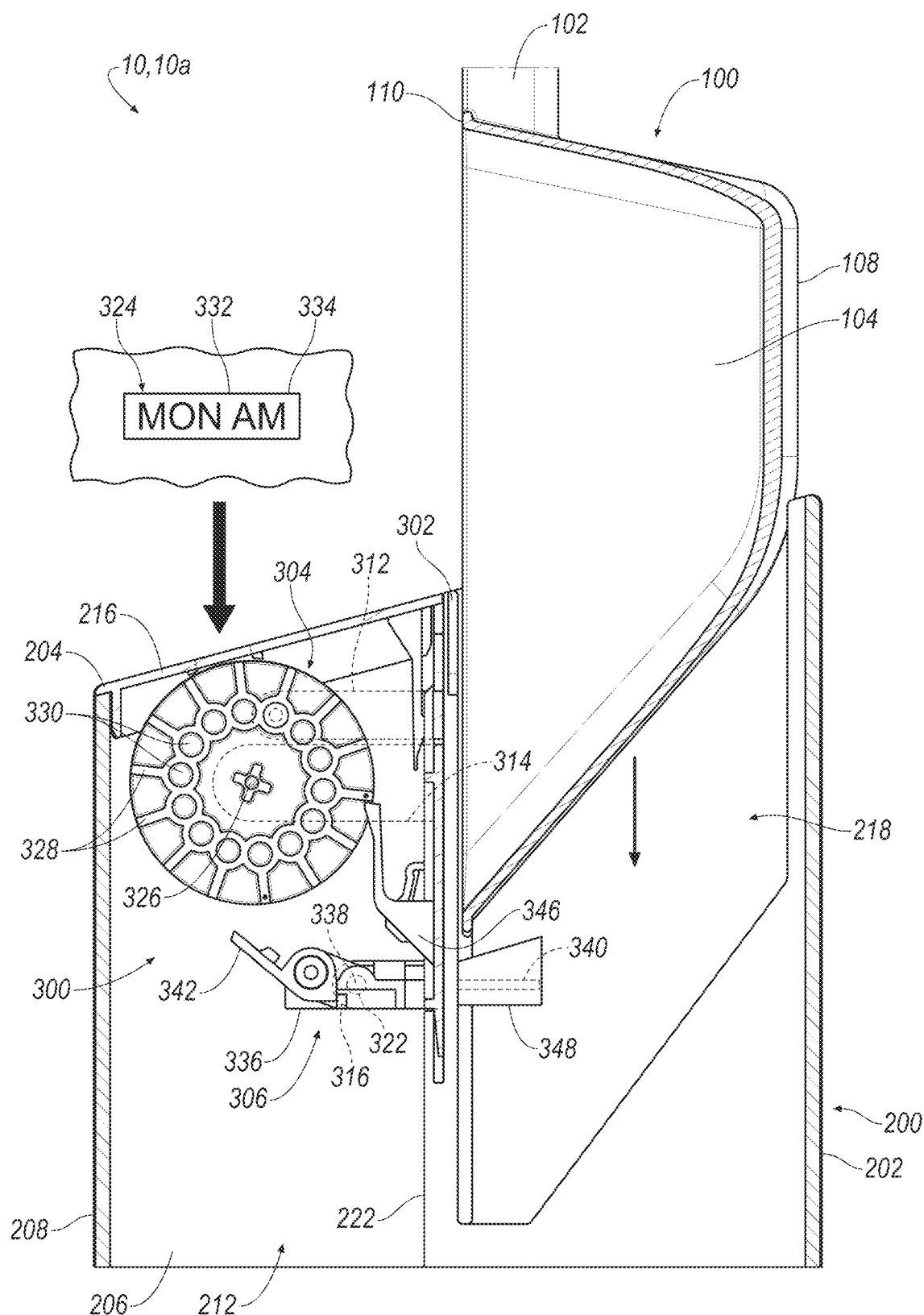
FIG. 10A is a partial cross-sectional view of another implementation of the assembly of FIGS. 1-3 in a first position.
Figure 10B:
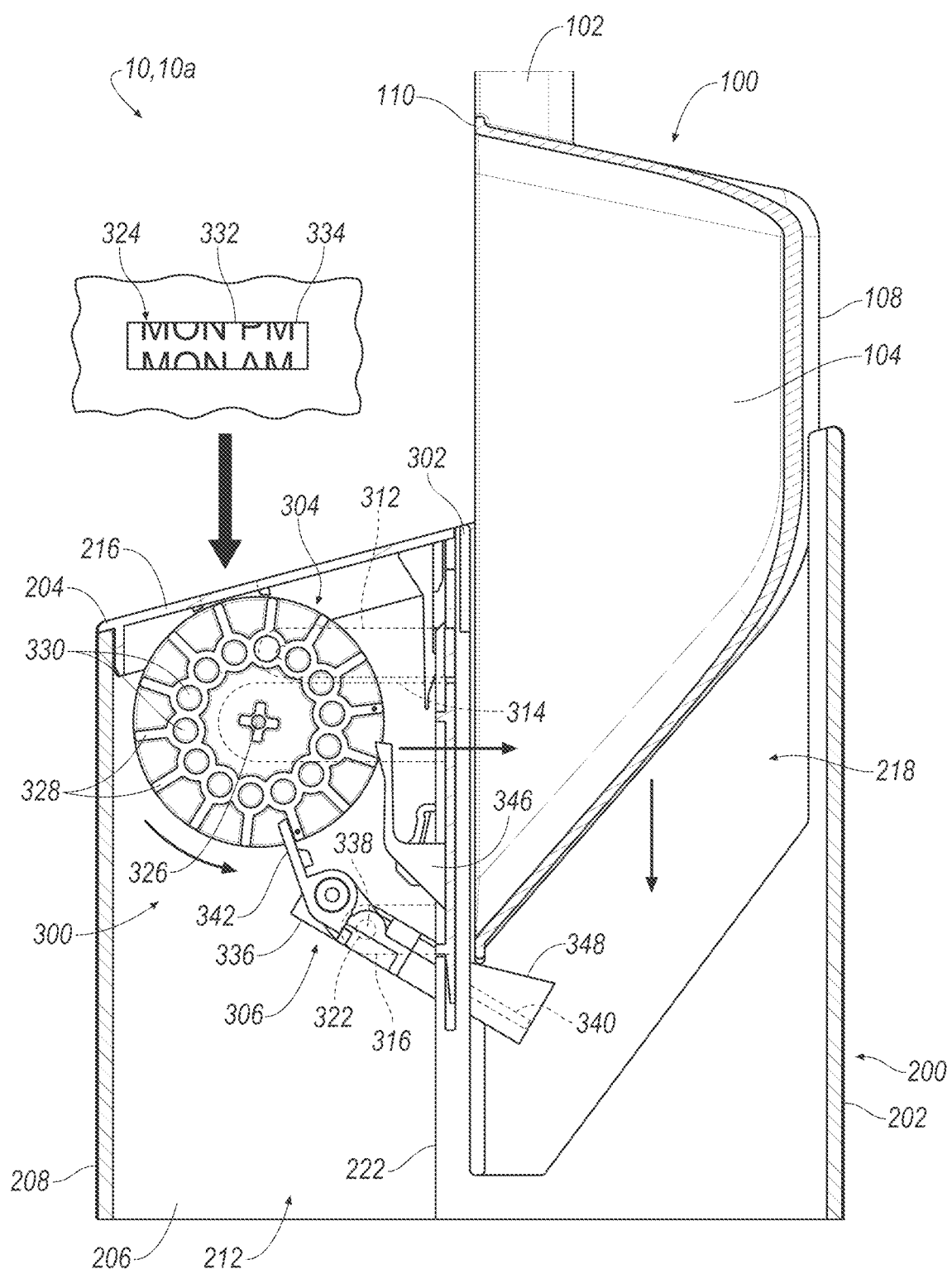
FIG. 10B is a partial cross-sectional view of the implementation of FIG. 10A of the assembly of FIGS. 1-3 in a second position.
Figure 10C:
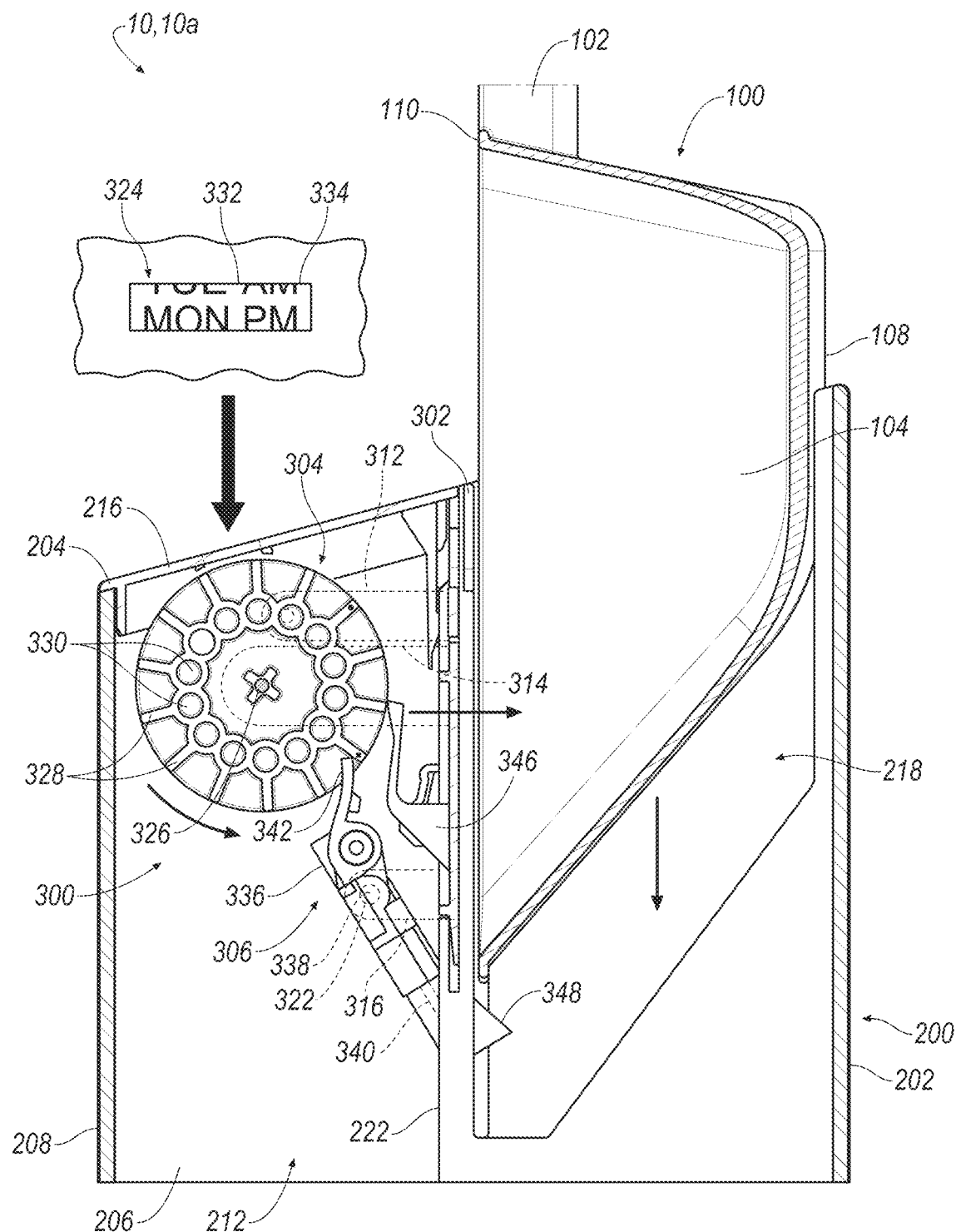
FIG. 10C is a partial cross-sectional view of the implementation of FIG. 10A of the assembly of FIGS. 1-3 in a third position.
Figure 10D:
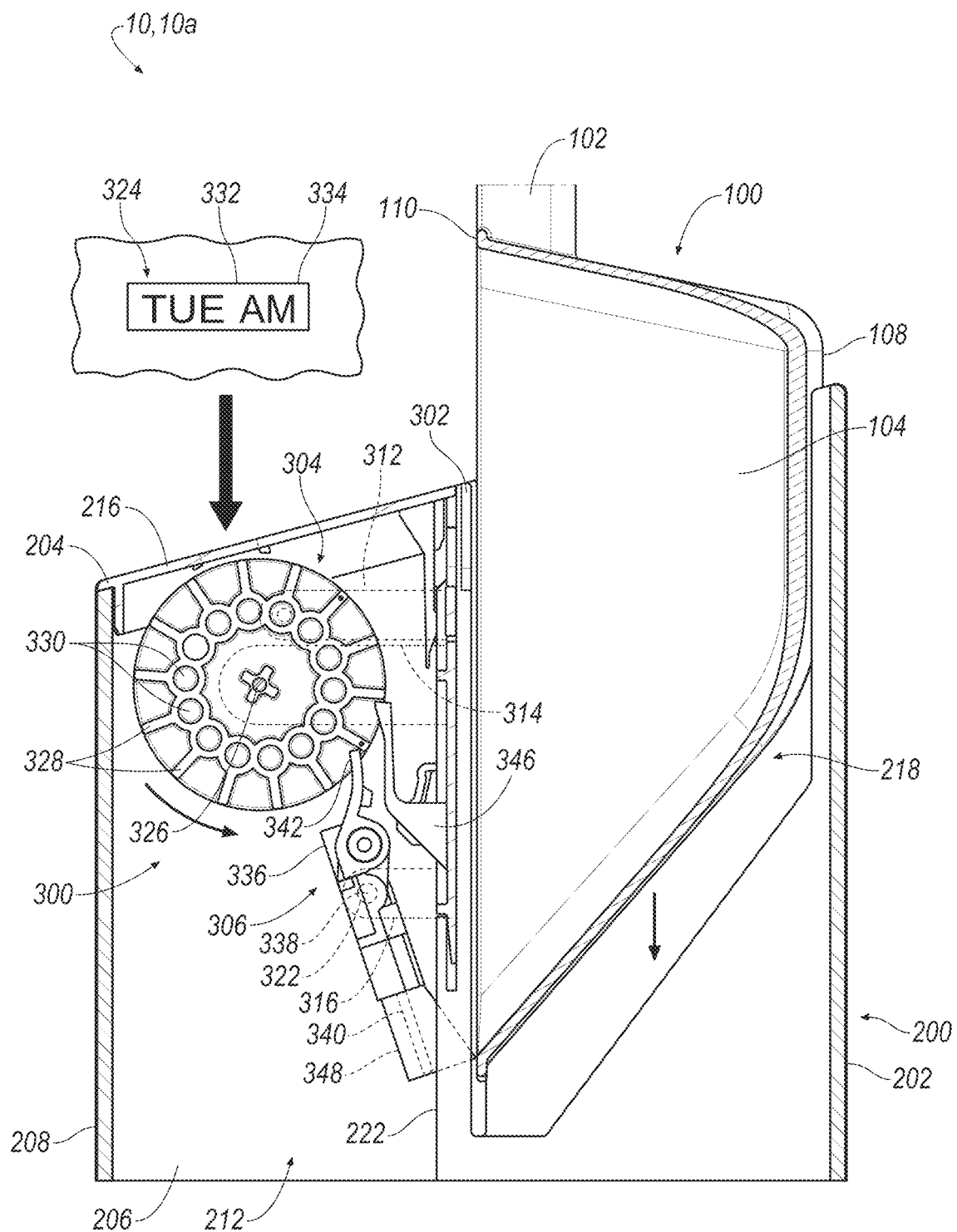
FIG. 10D is a partial cross-sectional view of the implementation of FIG. 10A of the assembly of FIGS. 1-3 in a fourth position.
Figure 10E:
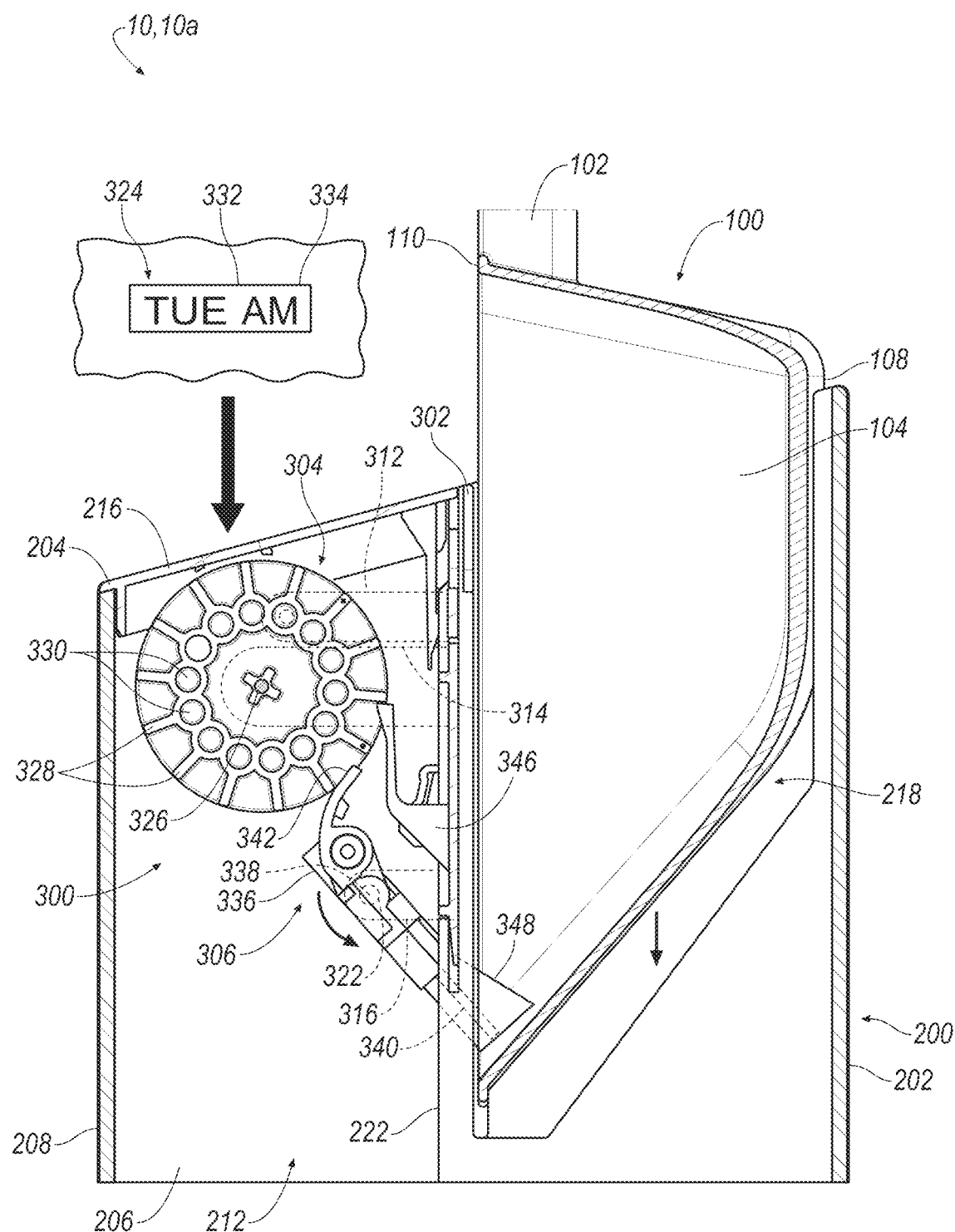
FIG. 10E is a partial cross-sectional view of the implementation of FIG. 10A of the assembly of FIGS. 1-3 in a fifth position.

As shown in FIG. 10A, the scoop 100, 100a may be positioned in the first orientation relative to the base member 200, 200a, and the temporal display 324 may display a day indicator 332 of "MON" and a morning-afternoon indicator 334 of "AM," corresponding to a current scheduled feeding time for the animal equal to Monday morning. As the scoop 100, 100a is manipulated further into the scoop-receiving cavity 218, the extender 348 may receive the scoop 100, 100a, and, compared to the lever arm 340, the extender 348 may cause the scoop 100, 100a to exert a force upon the extender 348 for a duration of time longer than a duration of time that the scoop 100, 100a exerted the force upon the lever arm 340 as shown in FIGS. 9A-F. For example, from the perspective of FIG. 10A, the extender 348 may increase a vertical thickness or a horizontal length of the lever arm 340. This modified interaction results in the drive arms 342 causing the wheel 304 to spin relative to the bracket 302 more than as shown in FIGS. 9A-F. For example, as the scoop 100, 100a exerts the force upon the extender 348, the wheel 304 spins, the protrusions 318 disengage from a first pair of the depressions 330, and the pawls 346 disengage from a first pair of the teeth 328. As the wheel 304 continues to spin, the protrusions 318 pass over a second pair of depressions 330 adjacent to the first pair of depressions 330, and the pawls 346 pass over a second pair of teeth 328 adjacent to the second pair of teeth 328.

The scoop 100, 100a continues to exert the force upon the extender 348, until the peripheral edge 110 is below the extender 348 and the extender 348 is extending into the receptacle 104 of the scoop 100, 100a. At this point, the wheel 304 rotates slightly back in an opposite direction, i.e., in a clockwise direction as shown between FIGS. 10D and 10E. Here, the protrusions 318 engage a third pair of the depressions 330 adjacent to the second pair of the depressions 330, and the pawls 346 engage a third pair of teeth 328 adjacent to the second pair of teeth 328. The second pair of depressions 330 may be between the first pair of depressions 330 and the third pair of depressions 330, and the second pair of teeth 328 may be between the first pair of teeth 328 and the third pair of teeth 328. At this point, the scoop 100, 100a is positioned in the second orientation, i.e., the scoop 100, 100a is fully inserted into the scoop-receiving cavity 218.

Figure 10F:
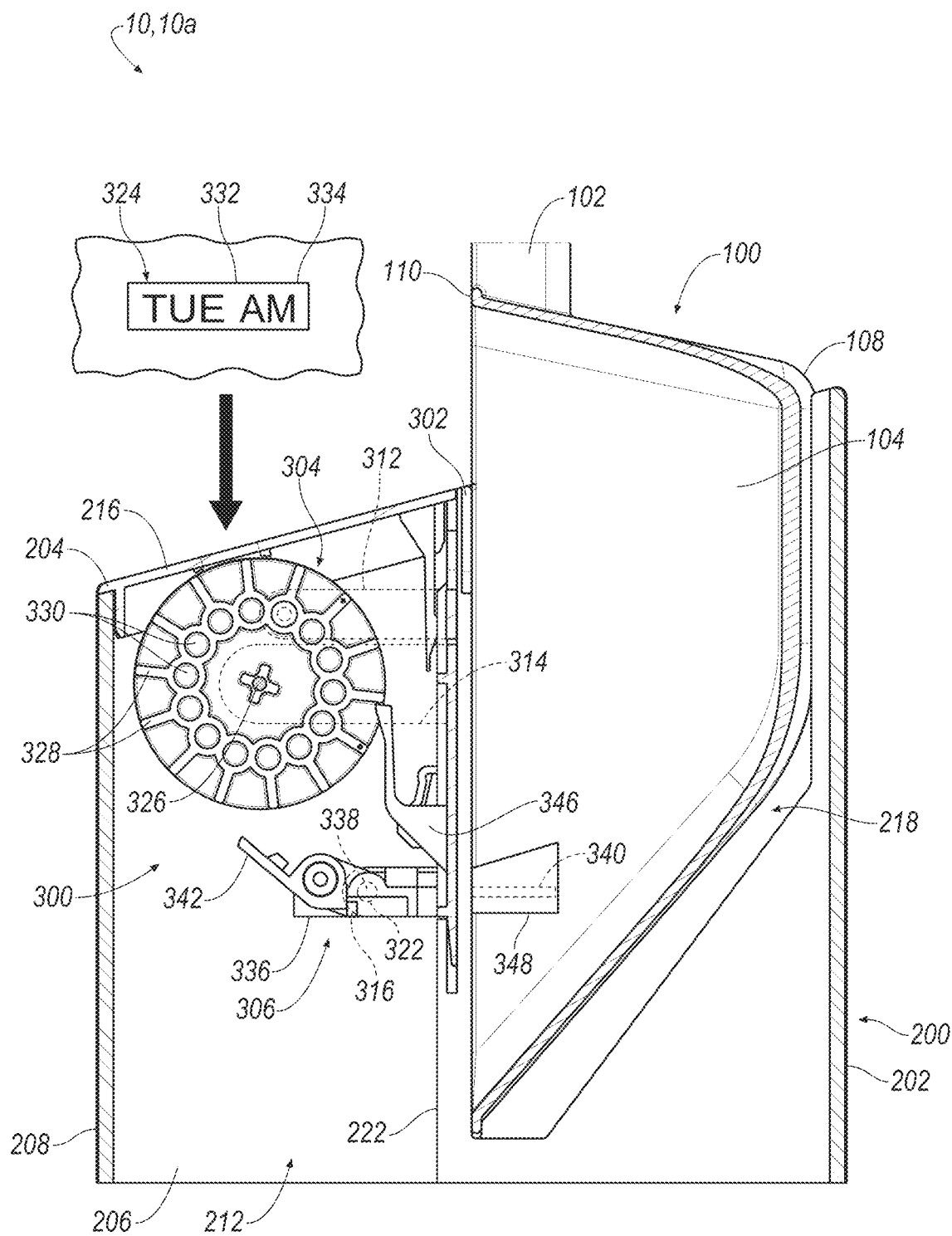
FIG. 10F is a partial cross-sectional view of the implementation of FIG. 10A of the assembly of FIGS. 1-3 in a sixth position.
Figure 11:
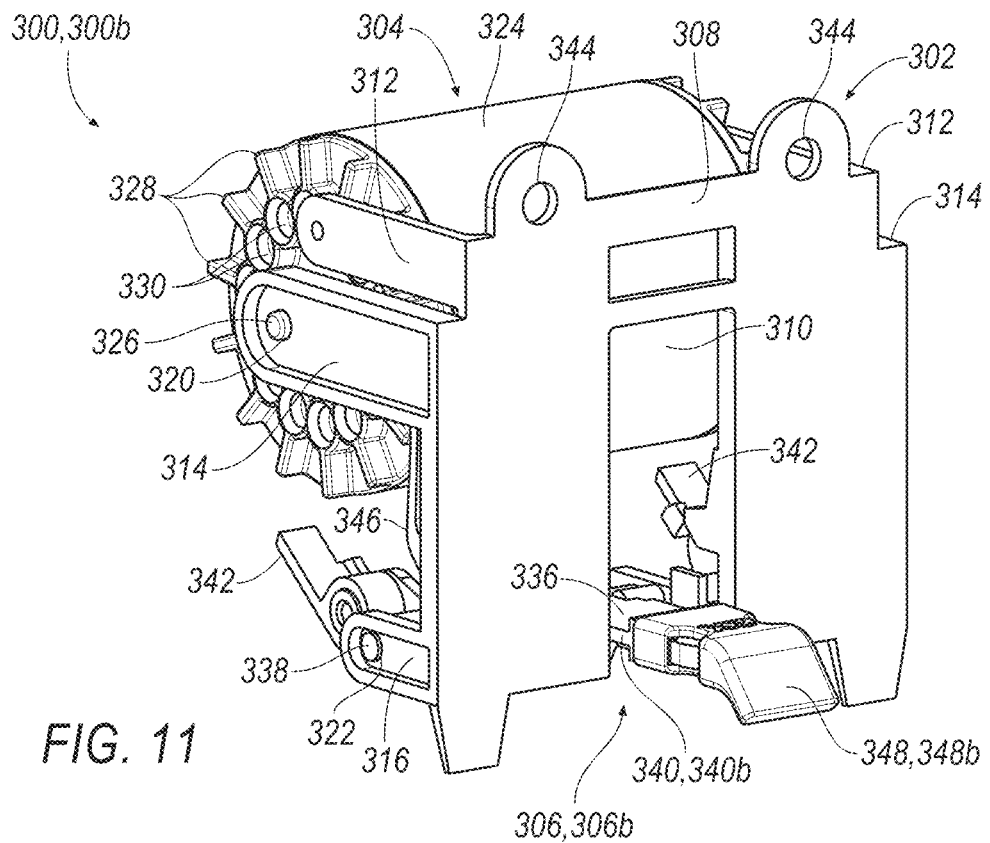
FIG. 11 is a perspective view of an exemplary display subassembly of the assembly of FIGS. 1-3.
Figure 12:
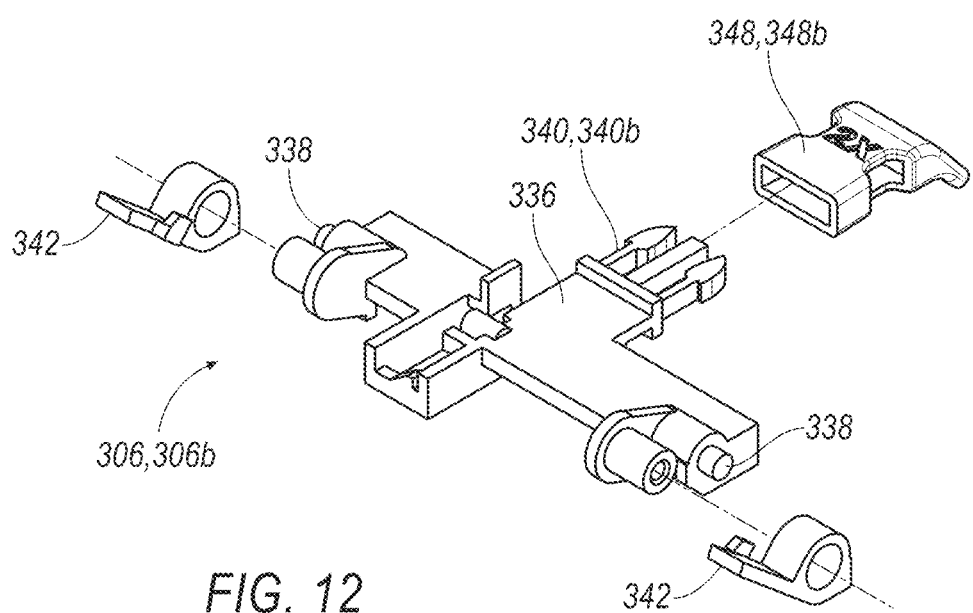
FIG. 12 is an exploded view of a portion of the display subassembly of FIG. 11.

As shown in FIG. 10F, the temporal display 324 changed such that the day indicator 332 displays "TUE" and the morning-afternoon indicator 334 displays "AM," corresponding to a next scheduled feeding time for the animal equal to Tuesday morning. That is, the scoop 100, 100a being manipulated from the first orientation to the second orientation triggered a response from the temporal display 324 to change from displaying a first temporal message (as shown in FIG. 10A) to displaying a third temporal message (as shown in FIG. 10F), passing over displaying a second or intermediate temporal message between the first temporal message and the third temporal message.

The extender 348 may be used to modify the feeding schedule of the animal. For example, if the feeding schedule of the animal requires that the animal be fed twice per day, i.e., once in the morning and once in the afternoon, then the extender 348 should be removed and the lever arm 340 should receive the scoop 100, 100a. If the feeding schedule of the animal requires that the animal be fed twice per day, i.e., once in the morning or once in the afternoon, then the extender 348 should be attached to the lever arm 340.

With reference to FIGS. 11-13B, another display subassembly 300, 300b for use with an assembly (e.g., assembly 10, 10a) for facilitating feeding an animal and tracking a feeding schedule of the animal is shown. The structure and function of the display subassembly 300b may be substantially similar to that of the display subassembly 300, 300a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

Figure 13A:
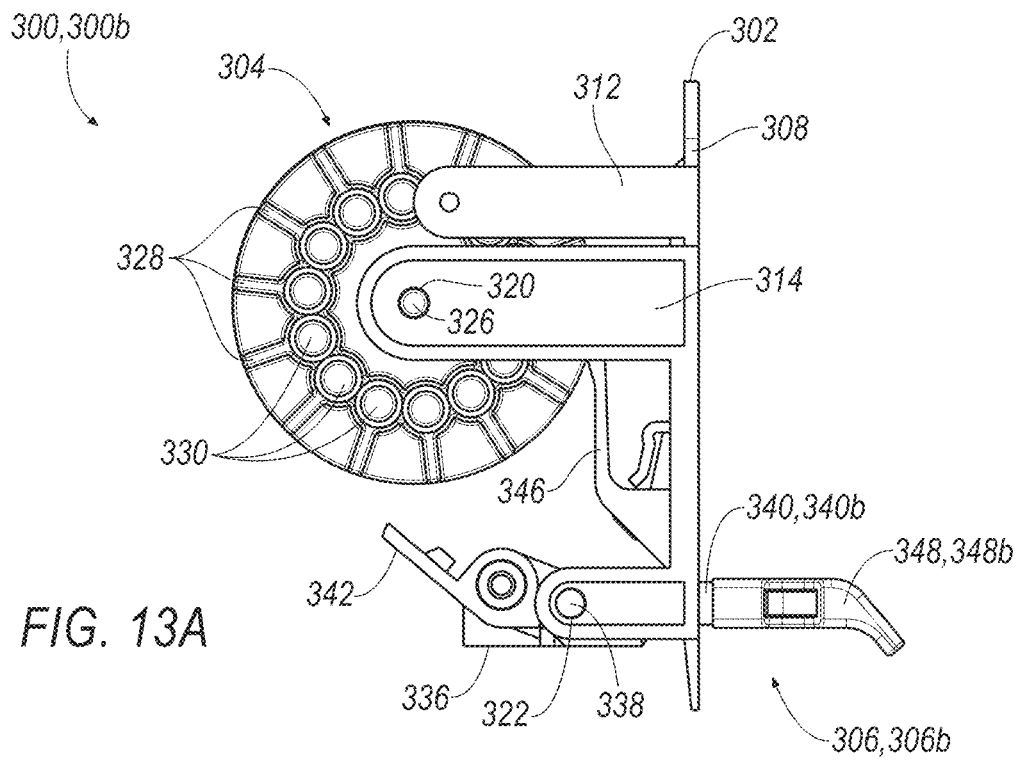
FIG. 13A is a side view of the display subassembly of FIG. 11.
Figure 13B:
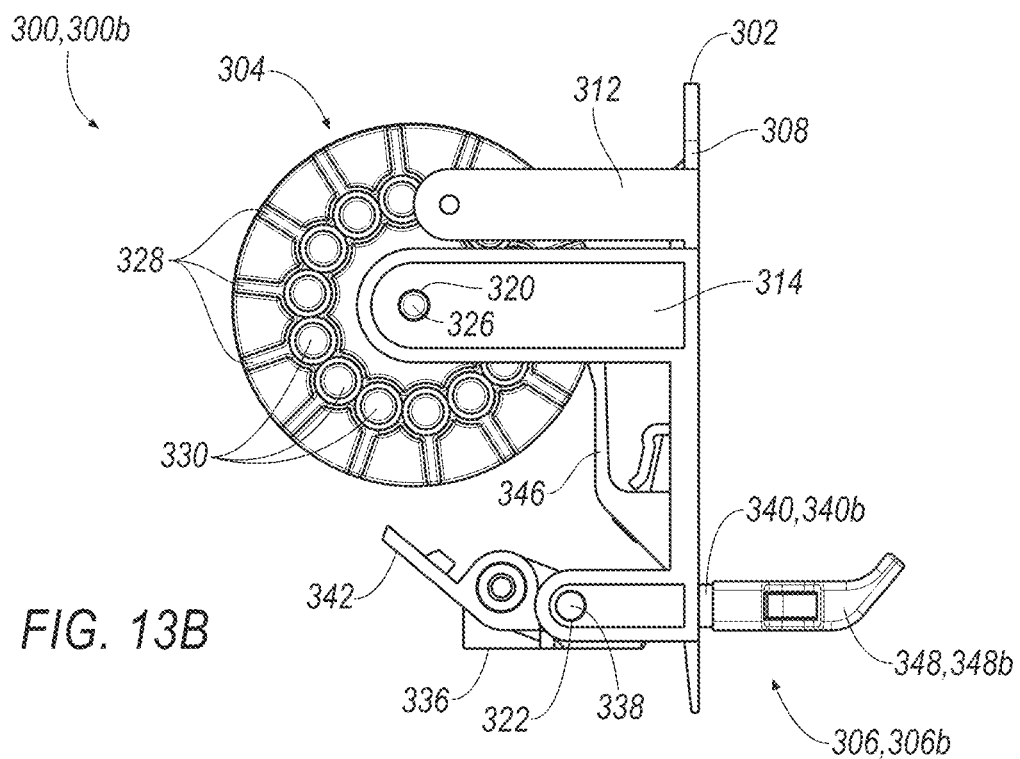
FIG. 13B is a side view of the display subassembly of FIG. 11.

The display subassembly 300b may include another drive component 306b, including another lever arm 340b and another extender 348b. The lever arm 340b and the extender 348b may be arranged in a male-female mechanical fastener arrangement with one of the lever arm 340b and the extender 348b being a male member and the other of the lever arm 340b and the extender 348b being a female member. This arrangement may allow the extender 348b to be selectively engageable with the lever arm 340b. As shown in FIGS. 13A and 13B, the extender 348b may be attached in any suitable orientation relative to the lever arm 340b. Similar to the extender 348, the extender 348b may cause the drive arms 342 to spin the wheel 304 such that the temporal display 324 changes from displaying a first temporal message to displaying a third temporal message, passing over displaying a second or intermediate temporal message between the first temporal message and the third temporal message.

Figure 14:
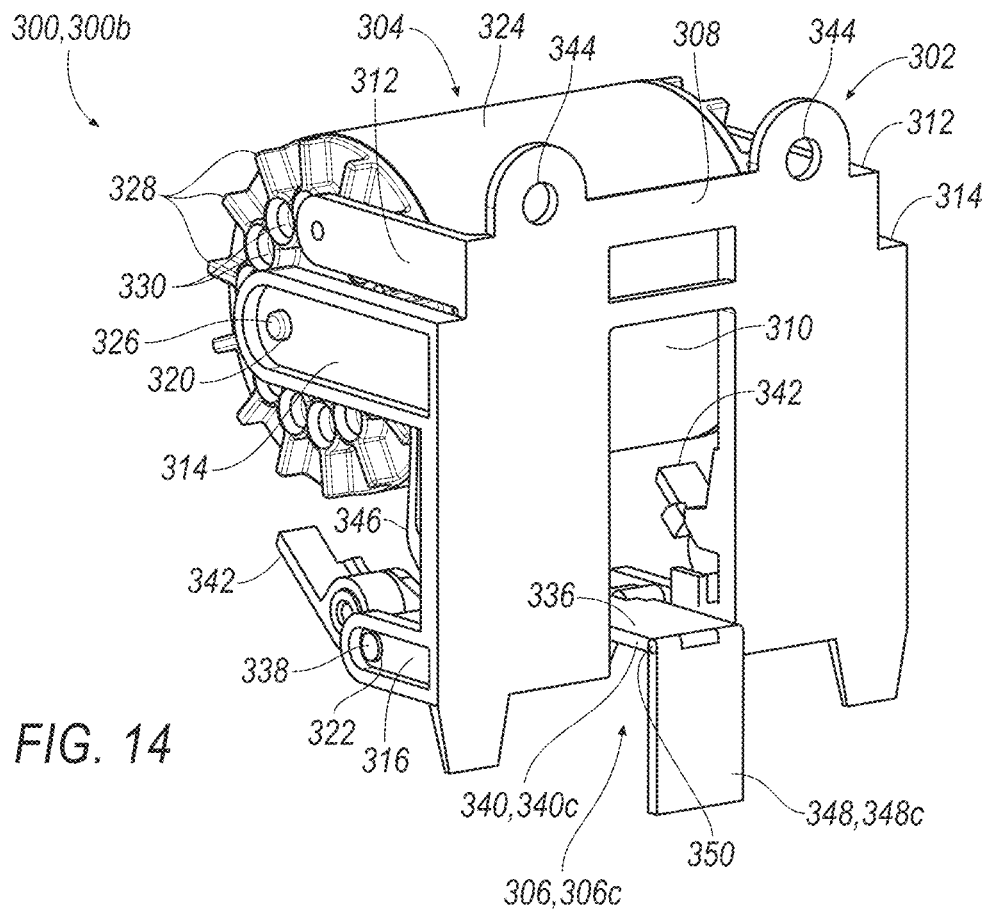
FIG. 14 is a perspective view of an exemplary display subassembly of the assembly of FIGS. 1-3.
Figure 15:
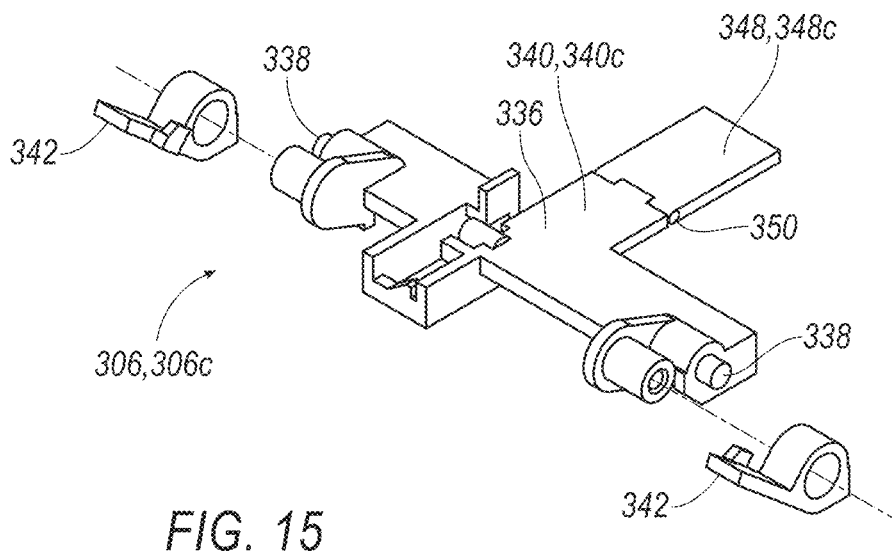
FIG. 15 is an exploded view of a portion of the display subassembly of FIG. 14.
Figure 18:
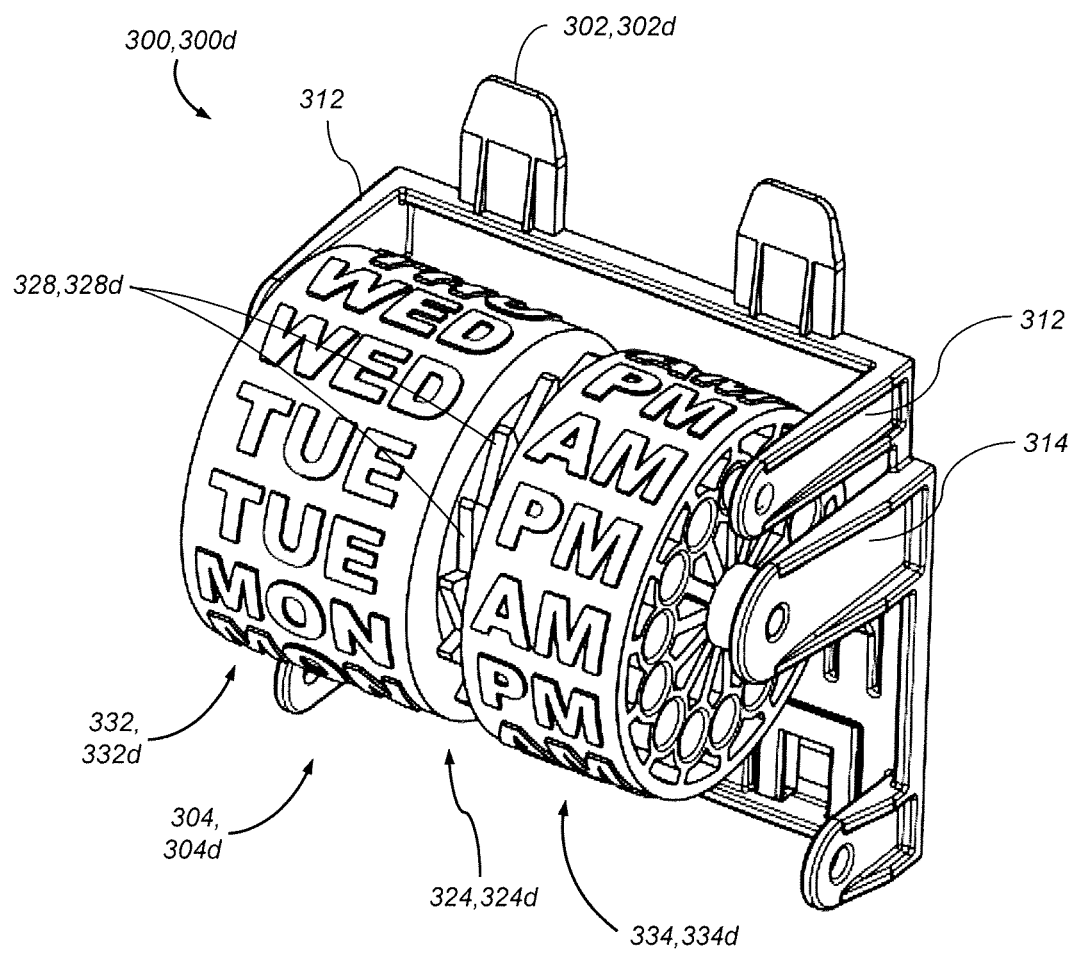
FIG. 18 is a perspective view of an exemplary display subassembly of the assembly of FIG. 16.
Figure 19A:
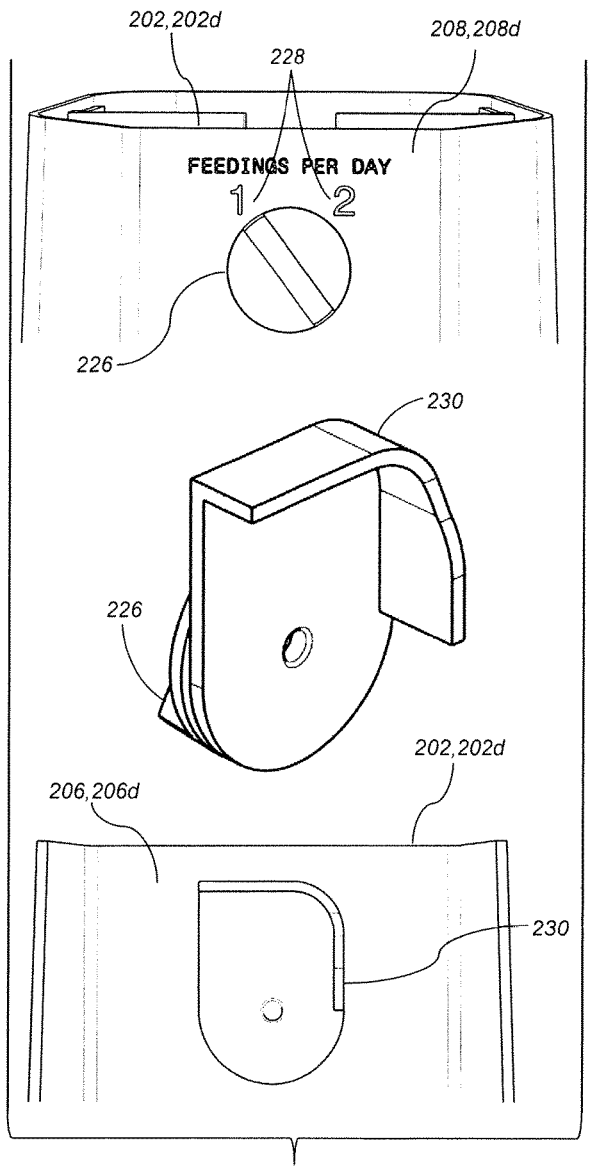
FIG. 19A is a detailed view of a portion of the assembly of FIG. 16 in a first position.
Figure 19B:
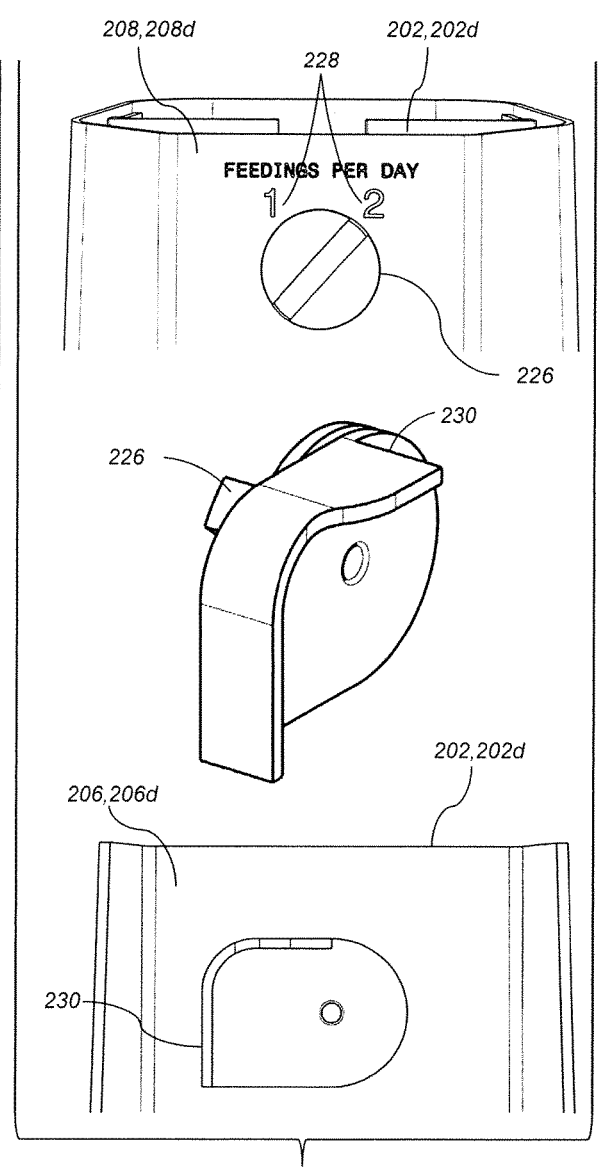
FIG. 19B is a detailed view of a portion of the assembly of FIG. 16 in a second position.

With reference to FIGS. 14 and 15, another display subassembly 300, 300c for use with an assembly (e.g., assembly 10, 10a) for facilitating feeding an animal and tracking a feeding schedule of the animal is shown. The structure and function of the display subassembly 300c may be substantially similar to that of the display subassembly 300, 300a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "c") are used to identify those features that have been modified.

The display subassembly 300c may include another drive component 306c having another lever arm 340c, another extender 348c, and a hinge 350. The extender 348c may be coupled to the lever arm 340c by the hinge 350 to allow the extender 348c move (e.g., pivot) between a first position, as shown in FIG. 14, and a second position, as shown in FIG. 15. When in the first position, the display subassembly 300c may operate as described above for an animal having a feeding schedule that requires feeding twice per day. When in the second position, the display subassembly 300c may operate as described above for an animal having a feeding schedule that requires feeding once per day.

With reference to FIGS. 16-20B, another assembly 10, 10d is shown. The structure and function of the assembly 10d may be substantially similar to that of the assembly 10, 10a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "d") are used to identify those features that have been modified.

The assembly 10d may include another base member 200d having another base 202d and another top 204d, and the top 204d may include another top surface 216d and another display aperture 220d. The display aperture 220d may include two display apertures 220d, one of the display apertures 220d displaying the day indicator 332 and the other of the display apertures 220d displaying the morning-afternoon indicator 334. The base 202d may include a dial 226 and feeding indicators 228 on another outer surface 208d of the base 202d. The feeding indicators 228 may reflect a feeding schedule of the animal of being fed once per day or twice per day. The dial 226 may be movable between a feeding schedule of being fed once per day or twice per day.

With reference to FIG. 17A-C, the assembly 10d may include another wheel 304d and another drive component 306d having another body 336d, another lever arm 340d, and another drive arm 342d. The wheel 304d may include two wheels 304d spaced from each other, with one of the wheels 304d displaying the day indicator 332 and the other of the wheels 304d displaying the morning-afternoon indicator 334d. Another plurality of teeth 328d may be disposed between the two wheels 304d. The teeth 328d may be a single set of teeth 328d that receive the drive arm 342d.

Figure 20A:
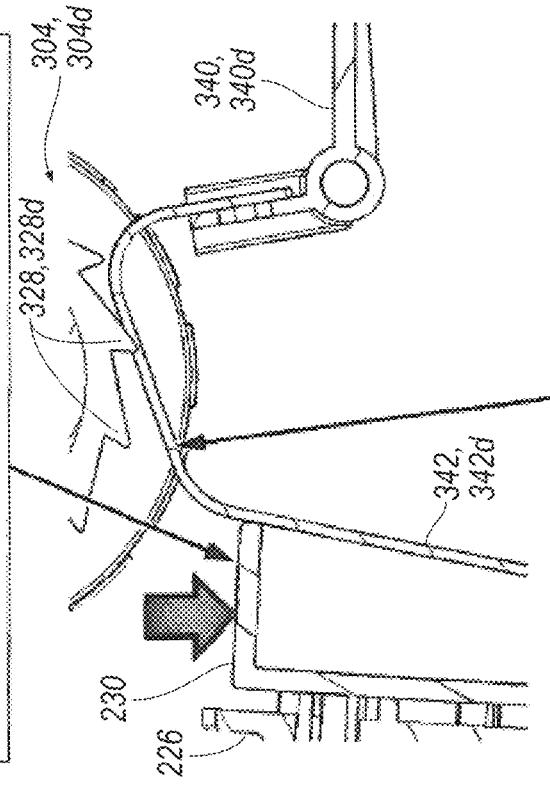
FIG. 20A is a partial cross-sectional view of a portion of the assembly of FIG. 16 in a first position.
Figure 20B:
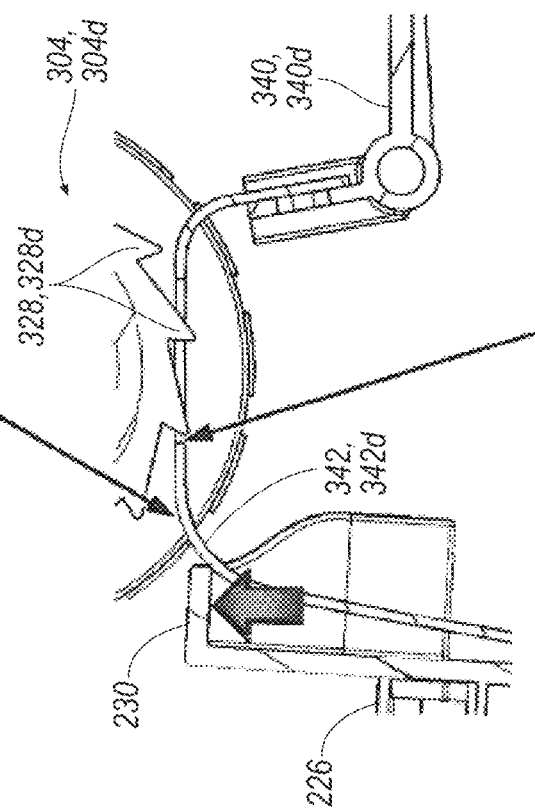
FIG. 20B is a partial cross-sectional view of a portion of the assembly of FIG. 16 in a second position.
Figures 24, 25:
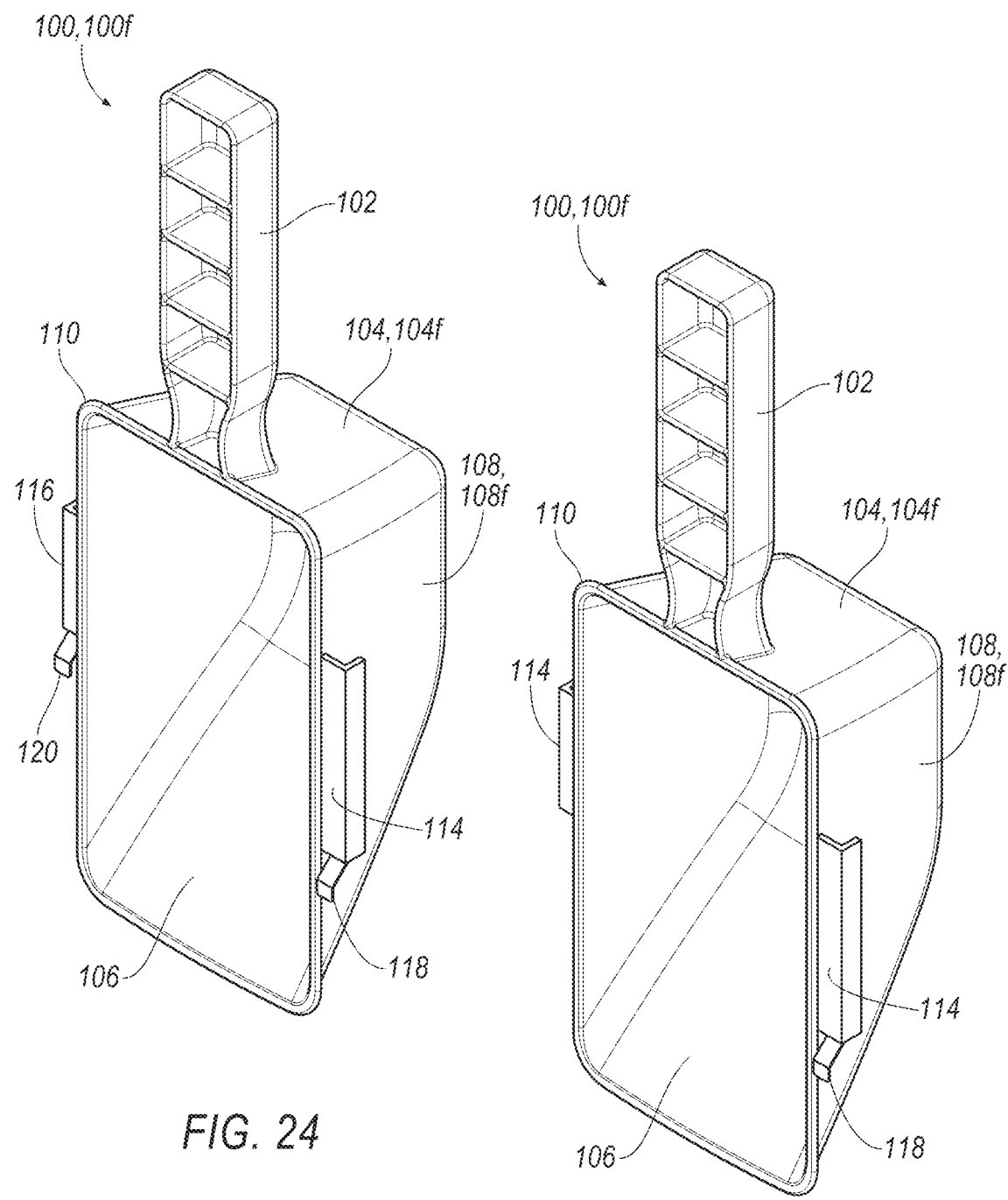
FIG. 24 is a perspective view of a first implementation of a portion of an exemplary assembly for facilitating feeding an animal and tracking a feeding schedule of the animal, in accordance with the principles of the present disclosure.
FIG. 25 is a perspective view of a second implementation of the portion of the assembly of FIG. 24.

With reference to FIGS. 19A-20B, when the dial 226 is pointed at the once-per-day feeding indicator 228, the drive arm 342d may be arranged in a first position as shown in FIG. 20A. In the first position, an inner bracket flange 230 attached to the dial 226 may cause the drive arm 342d to engage two of the teeth 328d, thus, the drive arm 342d may cause the wheel 304d to spin such that another temporal display 324d changes from displaying a first temporal message to displaying a third temporal message, passing over displaying a second or intermediate temporal message between the first temporal message and the third temporal message. When the dial 226 is pointed at the twice-per-day feeding indicator 228, the drive arm 342d may be arranged in a second position as shown in FIG. 20B. In the second position, the inner bracket flange 230 attached to the dial 226 may cause the drive arm 342d to engage one of the teeth 328d, thus, the drive arm 342d may cause the wheel 304d to spin such that the temporal display 324d changes from displaying a first temporal message to displaying a second temporal message adjacent to the first temporal message.

With reference to FIGS. 21-23, another scoop 100, 100e and another wheel 304, 304e for use with an assembly (e.g., assembly 10, 10a) for facilitating feeding an animal and tracking a feeding schedule of the animal are shown. The structure and function of the scoop 100e and wheel 304e may be substantially similar to that of the scoop 100, 100a and the wheel 304, 304a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "e") are used to identify those features that have been modified.

The scoop 100e may include another receptacle 104e having another inner surface 106e, another outer surface 108e, and another peripheral edge 110e. The receptacle 104e may include a front tab 112 flexibly attached to the outer surface 108e near the peripheral edge 110e. The wheel 304e may include another plurality of teeth 328e that may receive the front tab 112. During operation, as the scoop 100e is manipulated from the first orientation to the second orientation relative to the base member 200, the front tab 112 may engage the teeth 328e, causing the wheel 304e to spin, thus, changing from displaying a first temporal message to displaying a second temporal message. With reference to FIG. 23, as the scoop 100e is removed from the base member 200, i.e., manipulated from the second orientation to the first orientation, the front tab 112 may flex relative to the receptacle 104e in response to a force exerted on the front tab 112 by the wheel 304e, e.g., the teeth 328e of the wheel 304e. Such a response may allow the scoop 100e to be removed from the base member 200 without the front tab 112 improperly causing the wheel 304e to spin. That is, the front tab 112 may only engage the teeth 328e when the scoop 100e is manipulated from the first orientation to the second orientation, and the front tab 112 does not engage the teeth 328e when the scoop 100e is manipulated from the second orientation to the first orientation.

With reference to FIGS. 24-28, another scoop 100, 100f and another wheel 304, 304f for use with an assembly (e.g., assembly 10, 10a) for facilitating feeding an animal and tracking a feeding schedule of the animal are shown. The structure and function of the scoop 100f and wheel 304, 304f may be substantially similar to that of the scoop 100, 100a and the wheel 304, 304a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "f") are used to identify those features that have been modified.

Figure 28:
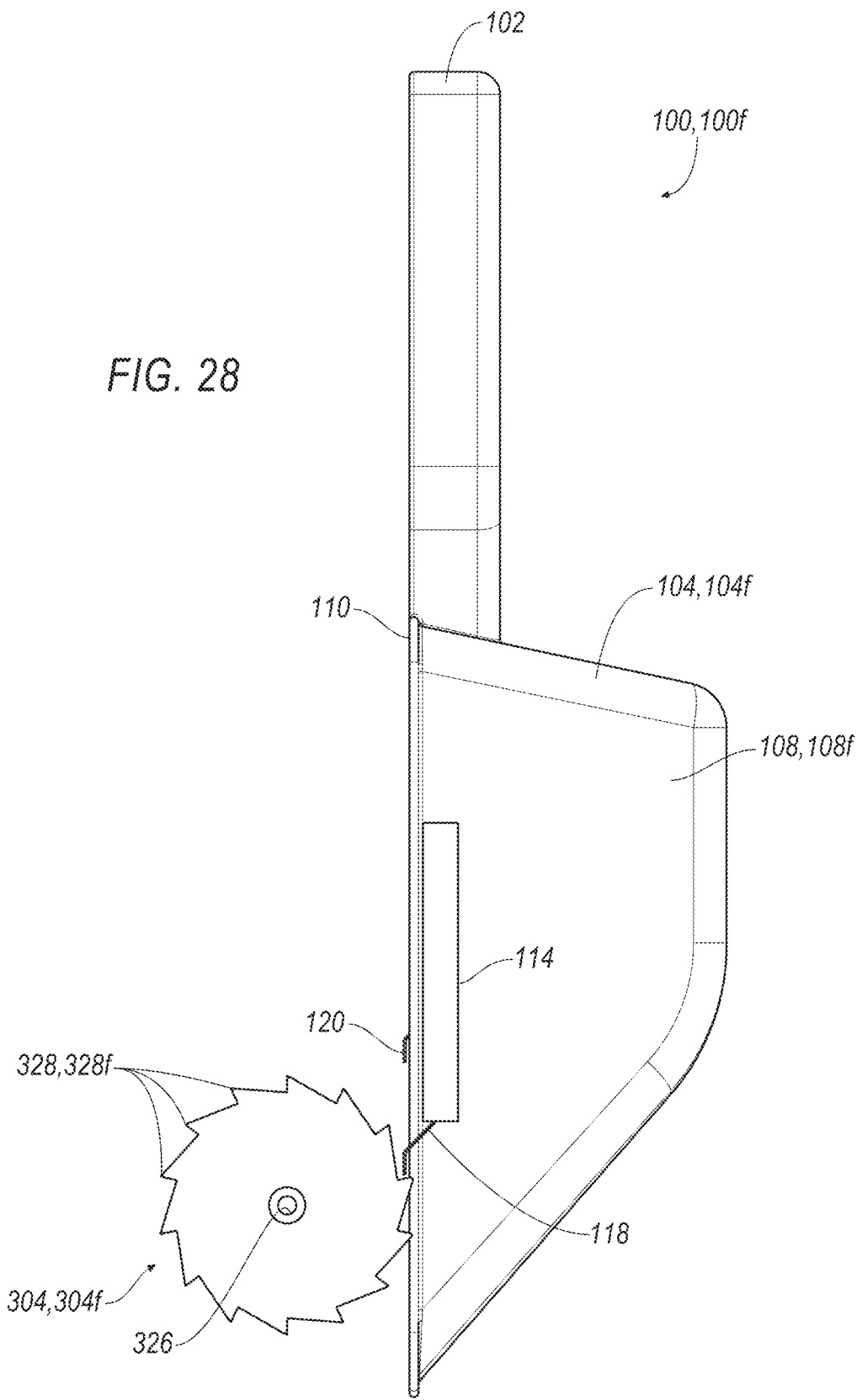
FIG. 28 is a side view of the first implementation of the portion of the assembly of FIGS. 24 and 26.

The scoop 100f may include another receptacle 104f having another outer surface 108f. The scoop 100f may have a first side slot 114 and a second side slot 116. The first side slot may include a first side tab 118 and the second side slot 116 may include a second side tab 120. The wheel 304f may include a second plurality of teeth 328f configured to receive each of the first side tab 118 and the second side tab 120. The first side tab 118 and the second side tab 120 may be staggered relative to each other, as shown in FIG. 28, such that when the scoop 100f is manipulated from the first orientation to the second orientation relative to the base member 200, the first side tab 118 engages the teeth 328f before the second side tab 120 engages the teeth 328f. By being staggered, each of the first side tab 118 and the second side tab 120 may engage one of the teeth 328f one after the other, thus, causing the wheel 304f to spin reflective of a once-per-day feeding schedule. The second side tab 120 may be removed, such that only the first side tab 118 engages one of the teeth 328f, thus, causing the wheel 304f to spin reflective of a twice-per-day feeding schedule.

Figure 29:
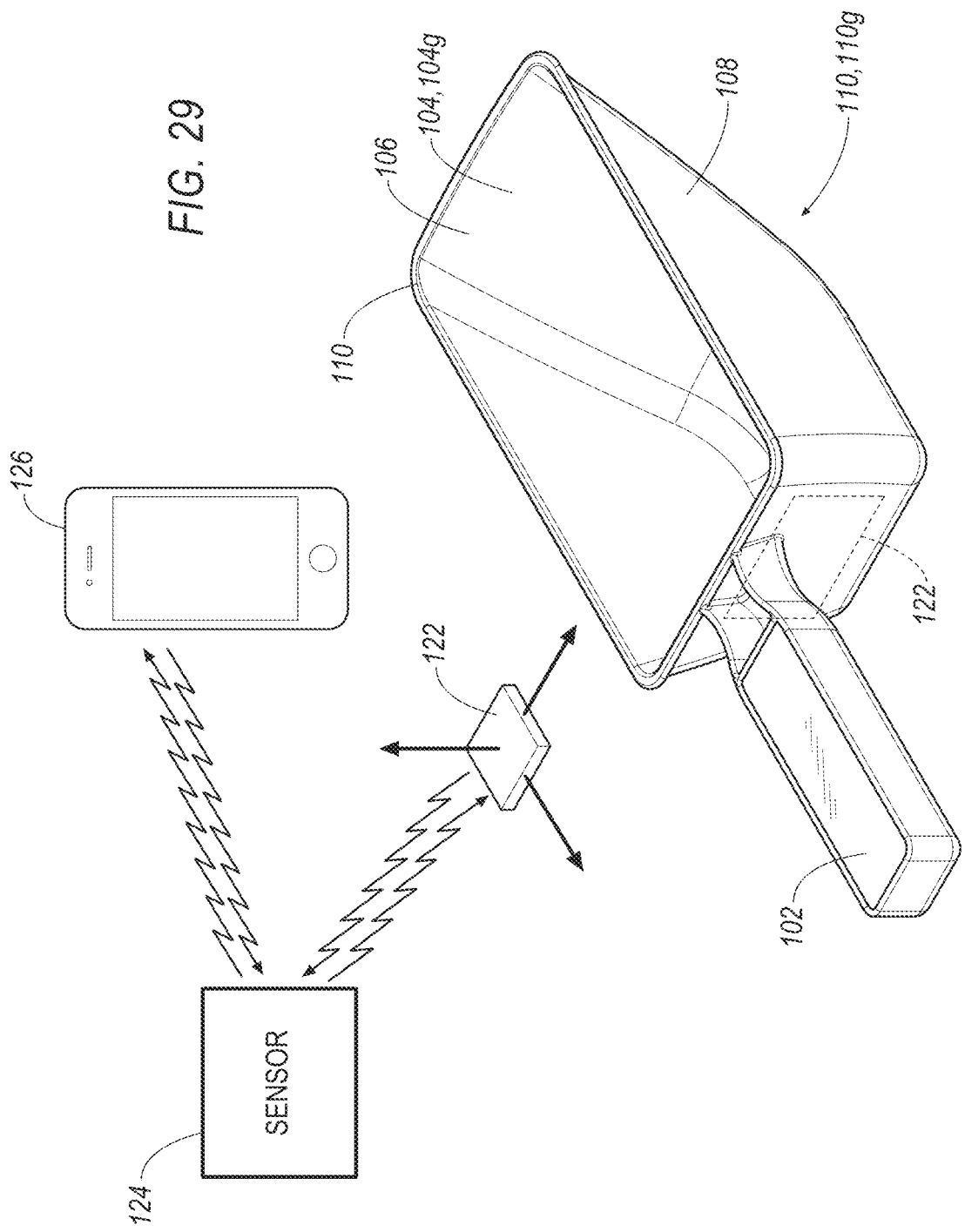
FIG. 29 is a perspective view of another exemplary assembly for facilitating feeding an animal and tracking a feeding schedule of the animal, in accordance with the principles of the present disclosure.

With reference to FIG. 29, another scoop 100, 100g is shown. The structure and function of the scoop 100g may be substantially similar to that of the scoop 100, 100a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "g") are used to identify those features that have been modified.

The scoop 100g may include another handle 102g and another receptacle 104g. The handle 102g may include another temporal display 324g, which may be an electronic display, such as, for example, a light-emitting diode (LED) display, a liquid crystal display (LCD), etc. The receptacle 104g may include an accelerometer 122 in communication with a microprocessor 128. The microprocessor 128 may process data collected by the accelerometer 122 to determine whether the scoop 100i has been manipulated from the first orientation to the second orientation, such that the current scheduled feeding time should be changed to the next scheduled feeding time. The microprocessor 128 may be in communication with a transmitter 124 and the temporal display 324g. The transmitter 124 may be in communication with a user device 126 through a network 132, such as, for example, Bluetooth, Wi-Fi, a wired connection, etc. The user device 126 may be any suitable device, such as, for example, a smartphone, a tablet, a computer, etc. The user device 126 may include another user input 226g to set a feeding schedule of the animal to once per day, twice per day, etc. As another example, the scoop 100g, e.g., the handle 102g, may include the user input 226g to set the feeding schedule.

Additionally, the user device 126 may be capable of performing several other functions related to the feeding of the animal. For example, the user device 126 may log feeding information, graph feeding information, send out alerts to animal caretakers related to feeding information, set an alarm for the next scheduled feeding time, etc.

As the scoop 100g is manipulated from the first orientation to the second orientation, the accelerometer 122 may detect movement of the scoop 100g and send this data to the microprocessor 128. The microprocessor 128 may interpret the data received from the accelerometer 122 and determine that the scoop 100g has been manipulated from the first orientation to the second orientation. The microprocessor 128 may then transmit a signal to the transmitter 124, which may communicate with the user device 126 indicating that the animal has been fed. The user device 126 may then change from displaying, e.g., on a screen of the user device 126, a current feeding time for the animal to displaying a next scheduled feeding time for the animal. Concurrently, the microprocessor 128 may communicate with the temporal display 324g indicating that the animal has been fed. The temporal display 324g may then change from displaying a current feeding time for the animal to displaying a next scheduled feeding time for the animal.

Figure 30:
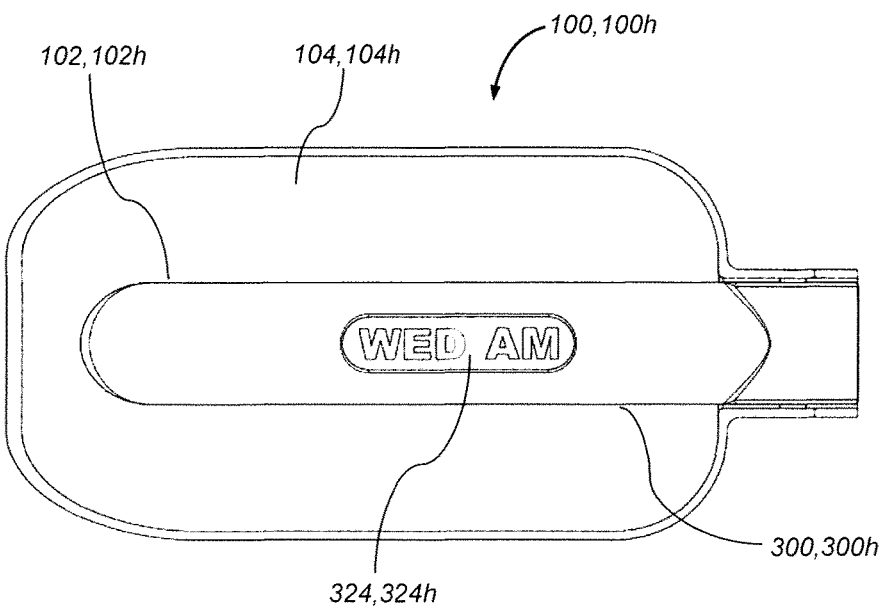
FIG. 30 is a perspective view of another exemplary assembly for facilitating feeding an animal and tracking a feeding schedule of the animal, the assembly being in a first position in accordance with the principles of the present disclosure.
Figure 31:
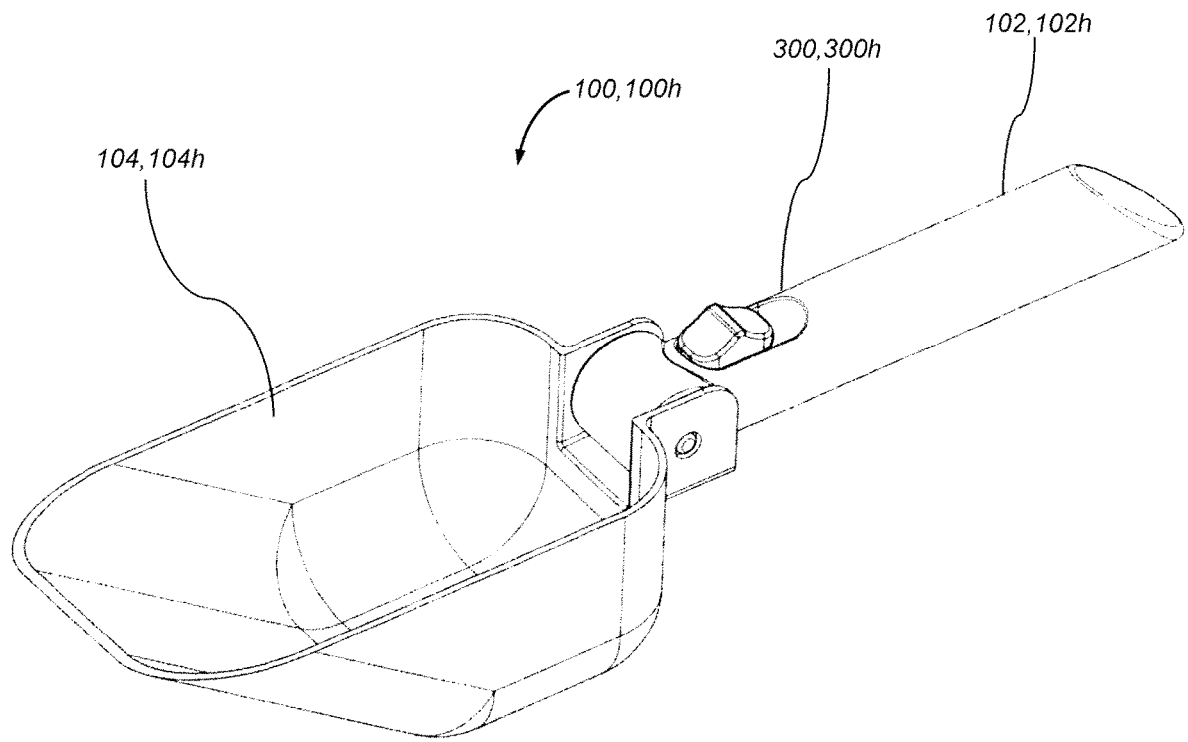
FIG. 31 is a perspective view of the assembly of FIG. 30, the assembly being in a second position.

With reference to FIGS. 30 and 31, another scoop 100, 100h and another display subassembly 300, 300h is shown. The structure and function of the scoop 100h and the display subassembly 300h may be substantially similar to that of the scoop 100, 100a and the display subassembly 300, 300a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "h") are used to identify those features that have been modified.

The scoop 100h may include another handle 102h and another receptacle 104h. The display subassembly 300h may include another temporal display 324h disposed in or on the handle 102h. The scoop 100h may move between a first position, as shown in FIG. 30, and a second position, as shown in FIG. 31. When moving at least a portion of the scoop 100h from the first position to the second position, or from the second position to the first position, the handle 102h may rotate relative to the receptacle 104h, causing the temporal display 324h to change from displaying a current feeding time for the animal to displaying a next scheduled feeding time for the animal. As one example, the display subassembly 300h may include a mechanical feature, such as a ratchet or wheel, disposed in the handle 102h that rotates from displaying a first temporal message to displaying a second temporal message as the scoop 100h is manipulated from the first position to the second position, or from the second position to the first position. As another example, the display subassembly 300h may include an electronic feature, such as an accelerometer or other sensor, disposed in the handle 102h that senses rotation of the handle 102h and causes the display subassembly 300h from displaying a first temporal message to displaying a second temporal message as the scoop 100h is manipulated from the first position to the second position, or from the second position to the first position.

Figure 32:
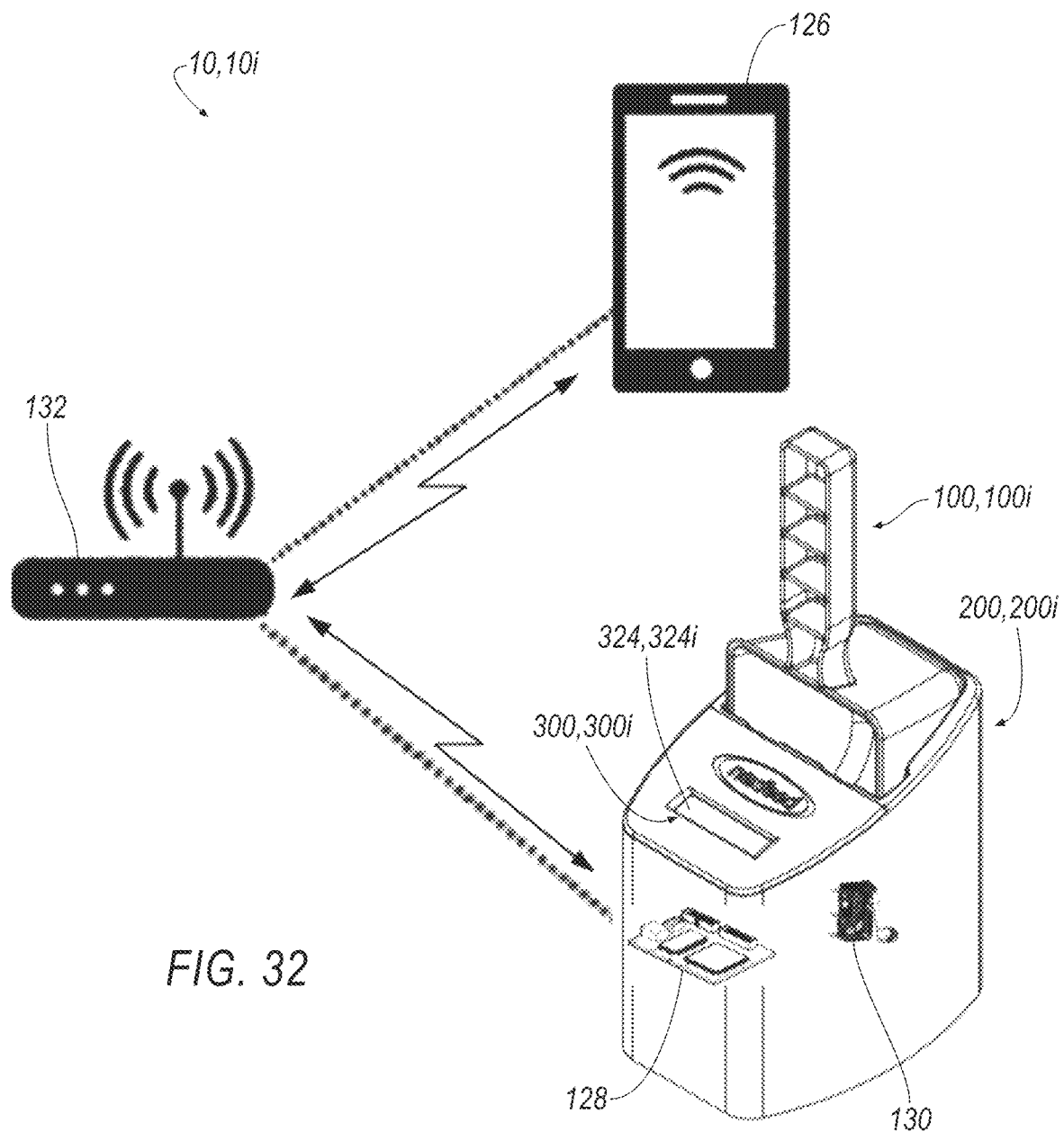
FIG. 32 is a perspective view of another exemplary assembly for facilitating feeding an animal and tracking a feeding schedule of the animal, in accordance with the principles of the present disclosure.

With reference to FIG. 32, another assembly 10, 10i is shown. The structure and function of the assembly 10i may be substantially similar to that of the assembly 10, 10a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "i") are used to identify those features that have been modified.

The assembly 10i may include another scoop 100i, another base member 200i, and another display subassembly 300i. The base member 200i may include the microprocessor 128 and a sensor 130. The sensor 130 may be any suitable type of sensor, such as, for example, an accelerometer, a light sensor, etc. The microprocessor 128 may process data collected by the sensor 130 to determine whether the scoop 100i has been manipulated from the first orientation to the second orientation, such that the current scheduled feeding time should be changed to the next scheduled feeding time. The microprocessor 128 may be in communication with a user device 126 through the network 132. The user device 126 may be any suitable device, such as, for example, a smartphone, a tablet, a computer, etc. The network 132 may be any suitable network, such as, for example, Bluetooth, Wi-Fi, etc. The display subassembly 300i may include another temporal display 324i, which may be an electronic display, such as, for example, a light-emitting diode (LED) display, a liquid crystal display (LCD), etc. The temporal display 324i may be in communication with the microprocessor 128 and may display a plurality of temporal messages indicating a feeding time for the animal. In operation, when the scoop 100i is manipulated from the first orientation to the second orientation, the sensor 130 may collect data related to this movement and sends this data to the microprocessor 128. The microprocessor 128 may determine, based on the data collected by the sensor 130, that the scoop 100i has been manipulated from the first orientation to the second orientation, and the microprocessor 128 may transmit to the temporal display 324i to change from displaying a current scheduled feeding time to a next scheduled feeding time. The microprocessor 128 may transmit to the user device 126, through the network 132, an indication that the animal has been fed. The user device 126 may then change from displaying, e.g., on a screen of the user device 126, a current feeding time for the animal to displaying a next scheduled feeding time for the animal.

Figure 33:
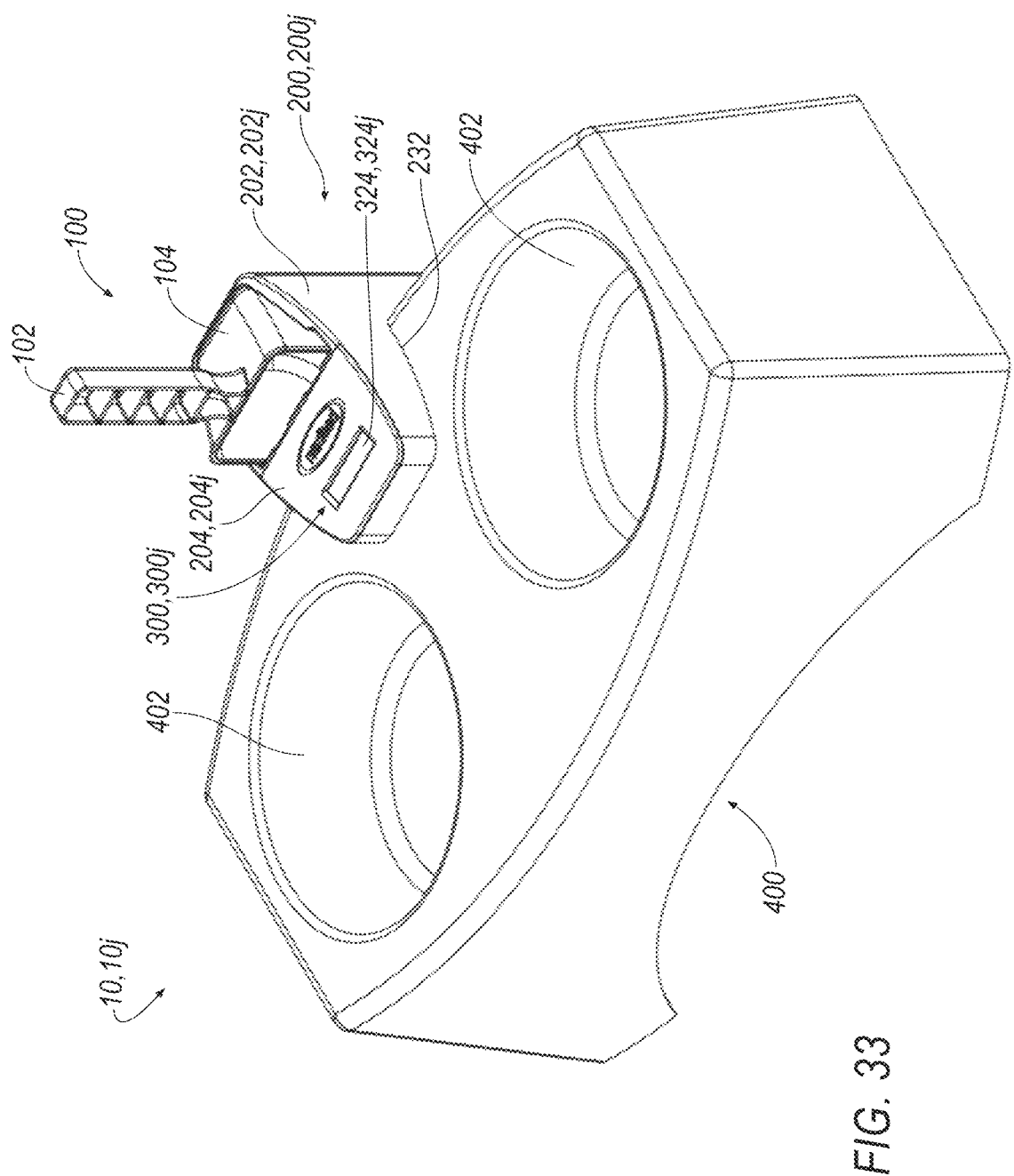
FIG. 33 is a perspective view of another exemplary assembly for facilitating feeding an animal and tracking a feeding schedule of the animal, in accordance with the principles of the present disclosure.

With reference to FIG. 33, another assembly 10, 10j is shown. The structure and function of the assembly 10j may be substantially similar to that of the assembly 10, 10a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "j") are used to identify those features that have been modified.

The assembly 10j may include another base member 200j, another display subassembly 300j, and a dish 400. The base member 200j may include another base 202j and another top 204j. The base 202j may include a slot 232 configured to receive the dish 400. The display subassembly 300j may include another temporal display 324j, which may be an electronic display, such as, for example, a light-emitting diode (LED) display, a liquid crystal display (LCD), etc. The display subassembly 300j may include any suitable mechanical, electrical, or electro-mechanical components, for example, as described above, to respond to the scoop 100 moving from the first orientation to the second orientation and change the temporal display 324j from displaying a current scheduled feeding time to displaying a next scheduled feeding time for the animal. The dish 400 may include a pair of receptacles or bowls 402 to further facilitate feeding of the animal.

Figure 34:
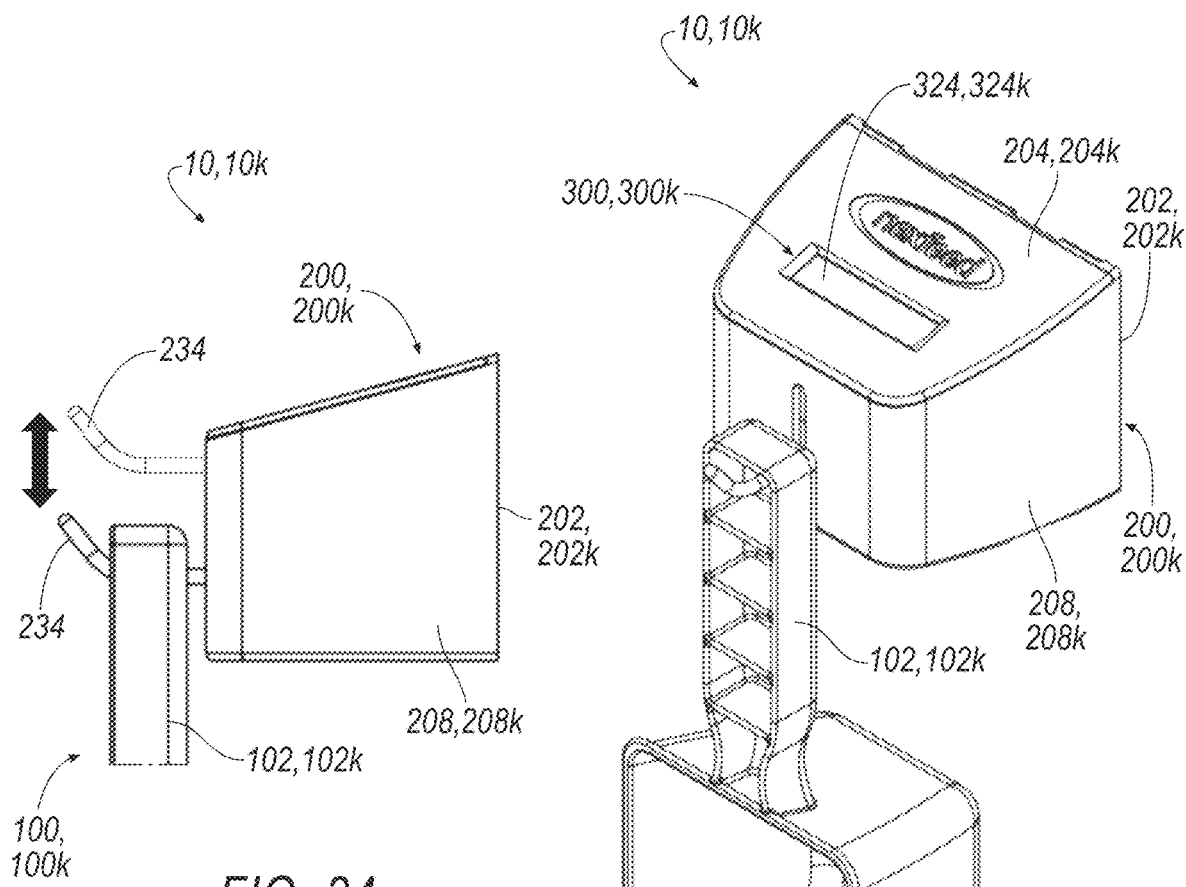
FIG. 34 is a side view of another exemplary assembly for facilitating feeding an animal and tracking a feeding schedule of the animal, in accordance with the principles of the present disclosure.
Figure 35:
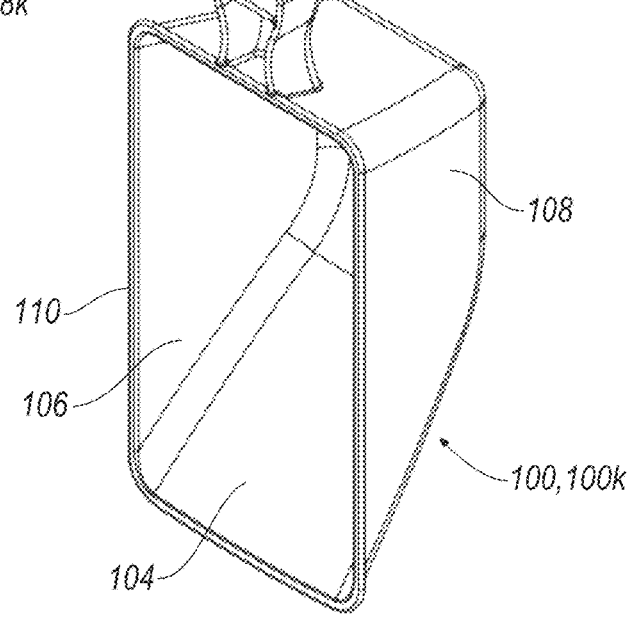
FIG. 35 is a perspective view of the assembly of FIG. 34.

With reference to FIGS. 34 and 35, another assembly 10, 10k is shown. The structure and function of the assembly 10k may be substantially similar to that of the assembly 10, 10a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "k") are used to identify those features that have been modified.

The assembly 10k may include another scoop 100k, another base member 200k, and another display subassembly 300k. The scoop 100k may include another handle 102k. The base member 200k may include another base 202k and another top 204k, the base 202k having another outer surface 208k. The base member 200k may include a hook 234 configured to receive the scoop 100k. The display subassembly 300k may include another temporal display 324k, which may be an electronic display, such as, for example, a light-emitting diode (LED) display, a liquid crystal display (LCD), etc. As shown in FIG. 34, the scoop 100k may be manipulated between a first position and a second position relative to the base member 200k. In the first position, the scoop 100k may be exterior to the hook 234, and the hook 234 may be in an upper position. In the second position, the scoop 100k may be engaged with the hook 234, and the hook 234 may be in a lower position, as shown in FIG. 35. The display subassembly 300k may include any suitable mechanical, electrical, or electro-mechanical components, for example, as described above, to respond to the scoop 100k moving from the first position to the second position and change the temporal display 324k from displaying a current scheduled feeding time to displaying a next scheduled feeding time for the animal.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An assembly for facilitating feeding an animal and tracking a feeding schedule of the animal, the assembly comprising:
   a scoop having a handle and a receptacle;

a temporal display attached to the scoop, the temporal display configured to display a plurality of temporal messages individually; and means for manipulating the temporal display to change the temporal display from displaying one of the plurality of temporal messages when at least a portion of the scoop is in a first orientation to displaying a different one of the plurality of temporal messages when at least a portion of the scoop is in a second orientation, the scoop being manipulated from the first orientation to the second orientation triggers a response from the temporal display to change from displaying one of the temporal messages to displaying another of the temporal messages, said means for manipulating having an adjustment component configured to modify the response from the temporal display to change from displaying one of the temporal messages to displaying another of the temporal messages, passing over displaying an intermediate temporal message.

2. The assembly of claim 1, further comprising a base member defining a cavity configured to receive the scoop, the scoop being in the first orientation relative to the base member when the scoop is exterior to the cavity and the scoop being in the second orientation relative to the base member when the scoop is fully inserted into the cavity.

3. The assembly of claim 1, wherein each of the plurality of temporal messages include a day indicator and a morning-afternoon indicator.

4. The assembly of claim 1, wherein the plurality of temporal messages includes fourteen discrete temporal messages.

5. An assembly for facilitating feeding an animal and tracking a feeding schedule of the animal, the assembly comprising:

a scoop having a handle and a receptacle;

a base member defining a cavity configured to receive the scoop;

a temporal display rotatably attached to one of the scoop or the base member, the temporal display displaying a first temporal message when the scoop is exterior to the cavity and rotating to display a second temporal message when the scoop is fully inserted into the cavity, the temporal display includes a plurality of teeth and the base member includes a pawl configured to engage with each of the plurality of teeth, the temporal display displays the first temporal message when the pawl is engaged with a first tooth of the plurality of teeth and the temporal display displays the second temporal message when the pawl is engaged with a second tooth of the plurality of teeth, the second tooth being adjacent to the first tooth; and an adjustment component configured to modify a response from the temporal display to change from displaying the first temporal message, where the pawl is engaged with the first tooth, to displaying a third temporal message, where the pawl is engaged with a third tooth of the plurality of teeth, passing over displaying the second temporal message, where the pawl is engaged with the second tooth, the second tooth being disposed between the first tooth and the third tooth.

6. The assembly of claim 5, wherein the temporal display is configured to display a plurality of temporal messages individually, each of the plurality of temporal messages corresponding to one of the plurality of teeth.

7. The assembly of claim 5, wherein the scoop being fully inserted into the cavity triggers a response from the temporal display to change from displaying the first temporal message to displaying the second temporal message.

8. The assembly of claim 5, wherein the first temporal message and the second temporal message each include a day indicator and a morning-afternoon indicator.

* * * * *